United States Patent
Logan et al.

(10) Patent No.: US 11,962,725 B2
(45) Date of Patent: *Apr. 16, 2024

(54) SYSTEMS AND METHODS FOR PROCESSING REQUESTS TO SEND PRIVATE POSTAL MAIL TO AN INMATE

(71) Applicant: HLFIP Holding, Inc., Seminole, FL (US)

(72) Inventors: Jonathan D. Logan, Tampa, FL (US); Justin Scott, Largo, FL (US)

(73) Assignee: HLFIP Holding, Inc., Seminole, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/549,349

(22) Filed: Dec. 13, 2021

(65) Prior Publication Data

US 2022/0103701 A1 Mar. 31, 2022

Related U.S. Application Data

(63) Continuation of application No. 17/004,035, filed on Aug. 27, 2020, now Pat. No. 11,201,974, which is a continuation-in-part of application No. 16/877,456, filed on May 18, 2020, now Pat. No. 11,637,940, which is a continuation of application No. 16/286,305, filed on Feb. 26, 2019, now Pat. No. 10,659,630.

(60) Provisional application No. 62/634,975, filed on Feb. 26, 2018.

(51) Int. Cl.
*H04N 1/00* (2006.01)
*G06Q 50/26* (2012.01)
*G06Q 50/32* (2012.01)
*G06V 30/416* (2022.01)
*G06V 40/12* (2022.01)
*G06V 40/16* (2022.01)
*H04N 1/44* (2006.01)

(52) U.S. Cl.
CPC ......... *H04N 1/00336* (2013.01); *G06Q 50/26* (2013.01); *G06Q 50/32* (2013.01); *G06V 30/416* (2022.01); *G06V 40/12* (2022.01); *G06V 40/16* (2022.01); *H04N 1/4473* (2013.01)

(58) Field of Classification Search
CPC ............. H04N 1/00336; H04N 1/4473; H04N 2201/3222; G06K 9/00469; G06K 9/00006; G06K 9/00221; G06Q 50/32; G06Q 50/26
USPC .......................................................... 726/4, 5
See application file for complete search history.

(56) References Cited

U.S. PATENT DOCUMENTS

2003/0072469 A1* 4/2003 Alden ....................... B07C 1/00
382/101
2018/0308154 A1* 10/2018 Hodge ............... G06Q 30/0635

* cited by examiner

*Primary Examiner* — Kent Yip
(74) *Attorney, Agent, or Firm* — Outlier Patent Attorneys, PLLC

(57) ABSTRACT

A method and system for maintaining privacy in private postal mail, such as privileged or other legal postal mail or medical mail, at a correctional facility comprising a privacy verification system to verify a privacy status of a sender and generate privacy status identifiers to be used on the legal postal mail. The privacy status identifiers when scanned or observed at a mail processing facility that processes incoming mail sent to inmates who are incarcerated in a correctional facility provides an indication to the mail processing facility that the mail is private so that appropriate measures can be taken to maintain privacy status.

20 Claims, 14 Drawing Sheets

SYSTEMS AND METHODS FOR PROCESSING REQUESTS TO SEND PRIVATE POSTAL MAIL TO AN INMATE

CROSS-REFERENCE TO RELATED APPLICATIONS

This application is a continuation of U.S. Non-Provisional patent application Ser. No. 17/004,035, entitled "SYSTEMS AND METHODS FOR PROCESSING REQUESTS TO SEND PRIVATE POSTAL MAIL TO AN INMATE" filed Aug. 27, 2020, which is a continuation-in-part of U.S. Non-Provisional patent application Ser. No. 16/877,456 entitled "CORRECTIONAL INSTITUTION LEGAL POSTAL MAIL PROCESSING SYSTEM AND METHOD" filed May 18, 2020. That application claims priority to U.S. Non-Provisional patent application Ser. No. 16/286,305 entitled "CORRECTIONAL INSTITUTION LEGAL POSTAL MAIL PROCESSING SYSTEM AND METHOD," filed Feb. 26, 2019, which issued as U.S. Pat. No. 10,659,630. The above referenced applications further claim priority to U.S. Provisional Patent Application No. 62/634,975, filed Feb. 26, 2018, entitled "CORRECTIONAL INSTITUTION LEGAL POSTAL MAIL PROCESSING SYSTEM AND METHOD".

Each of the above referenced applications is hereby incorporated by reference in its entirety for all purposes.

BACKGROUND

Field of the Art

The presently disclosed invention relates in general to the field of postal mail delivery, and in particular, to a system and method for providing copies of postal mail to individuals incarcerated in a correctional facility in a safe manner in order to ensure the elimination of any contraband, reduce administrative costs for the correctional facility, while still allowing for delivery of legal postal mail which is privileged and is intended to be viewable by the inmate only, and not by the correctional facility staff or investigators.

This disclosure relates to systems and methods for tracking private mail that is sent to a recipient at a correctional facility. More specifically, the inventive systems and methods help ensure that private mail is delivered to the intended recipient with privacy intact.

DISCUSSION OF THE STATE OF THE ART

Methods for the delivery of postal mail and electronic mail to inmates are known in the art. Procedures or methods for dispensing mail via traditional postal systems have been described in U.S. Pat. No. 5,917,925. Systems for using electronic messaging in institutions, such as prisons, have been described in U.S. Pat. No. 7,502,451. A system and method for electronically delivering postal mail to inmates is described in U.S. application Ser. No. 15/153,171. The foregoing patents and applications are hereby incorporated herein by reference, in their entirety. It is well known that legal postal mail is privileged and not searched by the facility staff prior to delivery to the inmate which provides an opportunity for contraband to be transferred by way of legal postal documents to inmates. This presents a problem for the correctional facility which needs to be resolved so inmates can receive legitimate privileged legal postal mail without the possibility of receiving contraband material. However, the system and method disclosed in U.S. application Ser. No. 15/153,171 and the associated procedures or methods do not adequately address the conversion of postal mail which is being sent to the inmate under the privileged legal postal mail category to electronic mail for the elimination of any contraband being delivered to prison inmates, and U.S. application Ser. No. 15/153,17, the disclosure of which is incorporated by reference in its entirety, does not address the processing of privileged legal postal mail that is not to be viewable by anyone other than the inmate, such as communications that are marked and appear by their envelope to be from the inmate's attorney. Embodiments of the presently disclosed invention address such limitations, inter alia, by providing an improved system and method for delivery of mail identified as legal postal mail to inmates in a correctional facility that allows for delivery of legal postal mail that can be viewed only by the inmate. The instant invention provides the correctional facility with greatly reduced likelihood that such legal postal mail could also be used for transferring or transmission of contraband to the inmate.

Corrections facilities typically inspect mail that is sent to an inmate to ensure the safety of corrections officers and prisoners, and to protect the integrity of the corrections system. Among other things, corrections facilities typically check for contraband, inappropriate or impermissible messages and/or images, messages that encourage or incite violence and/or criminal activity, etc. Generally, all incoming and outgoing "routine" mail is subject to opening and inspection by the jail staff. Moreover, all incoming routine mail may be opened and digitized in corrections facilities that permit prisoners to view their mail on a computing device.

Private or confidential mail, however, represents a special class of mail that, if intentionally opened for substantive review by an unintended recipient (whether by policy or otherwise), may compromise its privacy/confidentiality. For example, legal postal mail or privileged mail that is sent by an attorney to a client who is in a correctional facility, may not be opened for review by prison staff if privilege is to be maintained. Although prison officials may be able to check legal postal mail for contraband, they must do so in the presence of a prisoner who can confirm that the substance of the communication is not being reviewed. Moreover, a prison system or a prison official must obtain a warrant if they want to review the contents of mail that is purportedly sent by an attorney, by, for example, demonstrating that it likely contains material that will encourage or incite violence and/or criminal activity. Because of these rules, some non-privileged senders disguise their mail as privileged or legal postal mail in order to send inappropriate or prohibited communication or to send contraband.

Because of the special administrative rules for legal or privileged mail, and because of the potential for abuses, this mail represents a problem for correctional facilities that want to check mail for contraband and/or digitize mail that is sent to a prisoner. And, although prison systems have made progress in improving mail communication by providing digital alternatives, privileged mail has remained resistant to change because of the inherent technical, legal, and administrative challenges. Indeed, privileged mail is still handled in much the same way today as it was decades ago. Currently available solutions do not offer a way for correctional facilities to handle privileged mail, technically process privileged mail within its updated digitized infrastructure, or reduce the administrative costs associated with handling privileged mail.

SUMMARY

The present invention provides an apparatus, system and method for eliminating contraband in privileged legal postal mail delivered to a correctional facility. The processing facility for receiving the mail can either be at a central facility or located at the local correctional facility. Staff at a processing facility may receive postal mail for inmates which are located at many different facilities or are located at the same location as the processing facility. Upon receipt at the processing facility, the postal mail may be reviewed for information. Such information may be addressee or recipient inmate information, sender information, institution information, or any other information discoverable upon inspection, review or analysis of the postal mail without opening it. The staff determines that the mail contains privileged legal postal mail by using the results of the inspection, review or analysis of the postal mail and comparing it to a predetermined protocol which assists the staff to correctly categorize the mail as legal postal mail. The protocol may compare the sender with a known list, originator information, originating post office, court information, attorney name, law firm designator or other information to the information on the exterior of the postal mail.

If the postal mail meets the preset criteria for being privileged legal postal mail it can then be separated from the other non-legal postal mail. Once information is retrieved from the mail, the information may be associated with the intended recipient inmate, such as through an inmate identifier or email. The non-legal postal mail may then be processed by the appropriate method or protocol used by the processing facility which may include scanning it to create an electronic copy which may be stored, such as on a server which may be accessed over a network. The electronic copy of the non-legal postal may include any and all information obtained from the postal mail including its contents, and additional information such as whether contraband was found in the postal mail.

The privileged legal postal mail may optionally be logged as having been received, and then forwarded for delivery to the inmate without opening. The log can either be electronic or manual. If the processing facility is outside the correctional facility, then the legal postal mail may be received at the processing facility and forwarded to the correctional facility. If the processing facility is in the correctional facility, then the legal postal may be logged there, without opening, and then forwarded on to personnel at the correctional facility associated with the inmate for delivery to the inmate.

Regardless if the processing facility is remote or located at the correctional facility when the privileged legal postal mail arrives at the correctional facility associated with the inmate it may then be delivered to the inmate using a legal postal mail scanning station which is configured to process the legal postal mail to provide an appropriate inspection without violating the inmate's rights to privacy. The legal postal mail delivery station can be configured to have equipment and software which will provide for opening, scanning and delivering the scanned image copies in either printed copies or electronic copies depending on the desire of the inmate and institution. The legal postal mail delivery station could contain any combination of the following hardware associated software, a copier, a shredder, a scanner, a scanner shredder, a copier shredder, a tablet or other computer with memory, viewing software, printing software, portable storage medium docking device such as, but not limited to a USB connector, CD burner and reader, a printer and a camera. The legal postal mail may then be delivered to the inmate who, in front of correctional facility staff, will open the legal postal mail and copy it with the copier, or scan it with the scanner, after which it is shredded or placed into a secure inmate property bag. In the case of scanning, a scanned image will either be printed, loaded onto a portable storage medium or transmitted to a server for later viewing via an inmate messaging system. The legal postal mail scanning station may be in a fixed location or may be on a mobile cart.

The present invention utilizes a system and method for identifying, verifying, and processing private mail such as privileged or legal postal mail that is sent to prisoners or inmates in a correctional facility and that enables prisoners to view digital versions of mail (or duplicated hard copies) while also preserving privacy, such as privilege status. The invention utilizes software to validate the privacy status of senders, and provide the senders with a unique sender identifier. The unique sender identifier may be used to generate unique mail identifiers that may be attached to private mail. The unique mail identifiers may comprise information about the sender, the recipient, date that the identifier was generated and/or requested, etc.

The inventive systems and methods may be further utilized by a correctional facility to specially process and handle private mail with attached unique mail identifiers. For example, privileged mail or legal postal mail with unique mail identifiers may not be scanned or digitized as other non-privileged mail or non-legal postal mail that is sent to a prisoner. Instead, the unique mail identifier may be used to deliver the mail for additional special handling and/or processing. In some embodiments, the data associated with the unique mail identifier may be used to further determine whether the mail is appropriately designated as private. Moreover, the data associated with the unique mail identifier may be used to further determine whether the mail may be likely to contain contraband (such as pages that are soaked in or laced with drugs), and/or assess the likelihood that the mail may cause undesirable behaviors, such as inciting violence, etc.

The present invention enables private senders to send private communication to prisoners at correctional facilities that allow incoming and/or outgoing communication via digitized or electronic formats. In such facilities/systems, the present invention minimizes the risk that private mail may be inadvertently opened/digitized in a manner that would impair or compromise privilege. Moreover, the presently disclosed systems and methods protect the integrity of the communication systems at a correctional facility by adding an additional layer of verification to ensure that a sender is in fact permitted to send private mail. The present invention also enables sophisticated analysis, which may be used to determine whether private mail is improperly marked as private, whether the private mail is likely to contain contraband, and/or whether the private mail may contain improper communication that may incite violence, improper coordinated action, contraband, etc.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

FIG. 1 illustrates a schematic drawing of a cart providing a legal postal mail delivery station for the processing of legal postal mail in a correctional facility;

DETAILED DESCRIPTION

Figure 1:
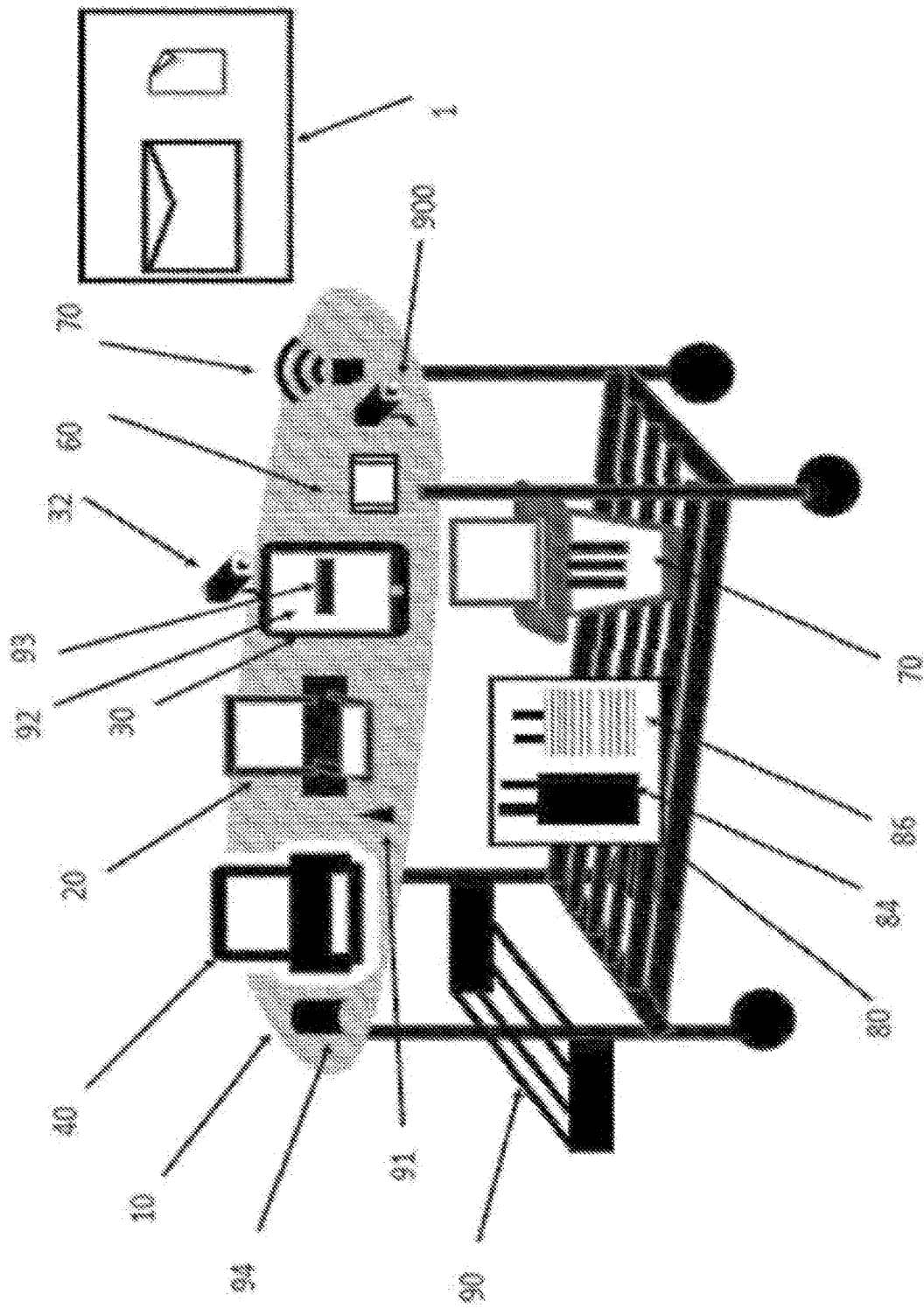

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments arc described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

A scanned image copy or scanned image or scan image are used interchangeably and is defined as a scan image of the legal postal mail and any associated materials including envelope, photographs, pictures, etc.

The term processing facility, central facility, mail processing facility are used interchangeably and refer to a facility for receiving the mail and can either be at a central facility or located at the local correctional facility.

An inmate messaging system and email system are used interchangeably and mean a messaging system that is accessible by the inmate.

Correctional facility staff, correctional personnel, correctional institution staff member, institution staff and institution personnel are used interchangeably and refer to individuals who work at the correctional institution.

Legal mail and legal postal mail are used interchangeably and refer to mail that cannot be viewed or processed by the correctional facility staff prior to delivery.

Portable computer, computer and tablet are used interchangeably and refer to a computer attached to legal mail processing cart.

Wireless mobile telecommunications technology and wireless network are used interchangeably and refer to wireless internet communication systems which are commonly referred to as 1G, 2G, 3G, 3.5G, 4G 4.5G and 5G networks Correctional facility, correctional institution, institution and facility are used interchangeably and refer to refer to a facility for housing inmates.

Legal postal mail and legal mail and postal mail are used interchangeably and refer to postal mail containing legal communications for an inmate. In addition, as described elsewhere in the specification, legal postal mail, legal mail and postal mail may refer to private postal mail that may be comprised of private communication such as mail containing or purporting to contain attorney-client privileged communication, doctor-patient privileged communication, as well as others, which will be apparent to a person of ordinary skill in the art.

Reference will now be made in detail to the embodiments of the presently disclosed invention, features of which are illustrated in the accompanying drawings.

Postal mail is a federal right to U.S. citizens incarcerated in a correctional facility within the United States. Postal mail, however, has been used to deliver inappropriate and illegal contraband, including photographs, pornography and illegal drugs, to inmates. While most postal mail can be searched for contraband before delivery to inmates, certain mail is considered privileged such as legal postal mail cannot be viewed or processed by the correctional facility staff prior to delivery. Herein the term "legal postal mail" refers to mail that correctional facility staff is not permitted to view by law, regulation or facility policy, and includes, without limitation, letters that appear to have been sent by inmate's legal postal counsel. Whether or not postal mail is to be treated as legal postal mail is determined by viewing information visible on the outside of the postal mail without opening it. The specific protocol used by the processing facility may include comparing the sender with a known list, originator information, originating post office, court information, attorney name, law firm designator or other information to the information on the exterior of the postal mail.

While most legal postal mail is likely to be contraband-free, particularly when it is legitimate communications from legal postal counsel, it is possible that some postal mail may be disguised as legal postal mail in order to avoid pre-delivery inspection, or, in rare cases, that unscrupulous persons may include contraband in otherwise legitimate legal postal mail (e.g. a personal note from a family member that has been treated in a way that can be used to deliver illegal postal substances into the facility). There is, therefore, a need to allow legal postal mail to be delivered to inmates in a way that complies with the inmate's rights, but also eliminates or greatly reduces the likelihood of legal postal mail being a conduit for contraband.

The present disclosure describes embodiments of systems and methods that meet this need in which legal postal mail is delivered to the inmate at a legal postal mail processing station. The legal postal mail processing station can be either a fixed or mobile processing station. When a fixed station is installed then the inmate must be taken to the location of the processing station. If the processing station is a mobile design, then the processing station is relocated to the inmate. In either case the institution personnel log into the legal mail processing cart computer to initiate the process, then the legal postal mail is opened by the inmate in front of correctional facility staff and inserted into a scanner or copier which is part of the processing station. If the processing station has a copier and that copier is used to replicate the legal postal mail then the inmate is given the copies of the copied document and the inmate confirms that all the pages are readable and useable prior to the corrections officer or inmate placing the legal postal mail into the shedder for disposal of the original legal postal mail or into a secure inmate property bag for storage which eliminates the possibility of any contraband being transferred to the inmate. If the legal postal mail is scanned at the legal postal mail processing station then the scanned legal postal mail is then either printed or reviewed on a computer (herein the term "computer" refers to any device capable of displaying the scanned image or delivering such image to an inmate messaging system including, but not limited to a tablet computer, desktop computer or laptop, the computer being configured with memory and electronic communication means-such as, but not limited to, Bluetooth®, Zigbee®, WiFi, 3G, 4G and 5G wireless mobile telecommunications technology, radio frequency, telephonic modem signals and wired ethernet). Once the inmate determines that the scan is accurate, the original legal postal mail is deposited into a shredder or into a secure inmate property bag for storage, which eliminates the possibility of any contraband being transferred to the inmate. In the event a printed copy was made, the printed copy will be contraband-free and may be left with the inmate. In the event an electronic scan was made, it may be delivered to an inmate messaging system and flagged as a privileged message such that the messaging system will allow it to be viewed only by the inmate and not by correctional facility staff. A third option that is anticipated by the instant invention is where the legal postal mail processing station is located at a central processing facility and the inmate joins the opening process via video conferencing. When this process is used then the inmate controls the opening and scanning of the mail and confirms that the mail has been scanned accurately via the video conferencing method before the correctional facility staff is released by the inmate to shred the legal postal mail or place the legal postal mail into their property storage. In certain embodiments non-legal postal mail processed at a central facility is also scanned and viewed by the inmate through the same messaging system, as is described in the incorporated references. In certain embodiments the opening and scanning process is recorded with a camera and the video is stored on the legal postal mail scanning station or uploaded to a server where the record of the opening and scanning may be retrieved and reviewed at a later time.

An alternate embodiment provides for a unique identifier for each piece of legal postal mail. The identifier is placed on the legal postal mail once it is identified by the staff as legal postal mail. This provides a unique identifier for the legal postal mail and insures that there is proper handling of the mail. The unique identifier could be in any form that allows electronic tracking so that the mail is easily identifiable as legal postal mail. The following is a brief description of the process utilizing the unique identifier to track legal postal mail within the facility and insure that the mail is delivered expeditiously to the correct inmate. The process could utilize the following steps:

1) When legal postal mail has been identified at the mail receiving station as legal postal mail it is assigned a unique identifier id which has a corresponding RFID and/or bar code. Alternatively, the institution could also use a Bluetooth®, LTE, WiFi or ZigBee® transmitter as the unique identifier and the address or id for that transmitter would be associated with the particular piece of mail.
2) The unique identifier id is then associated with the legal postal mail 1 and the inmate identifier which is associated with the inmate who the legal postal mail is addressed to by entering it in a legal postal computer tracking system which must be accessible from the legal postal mail processing cart.
3) The legal postal mail and the legal postal mail processing cart will be taken to the inmate or if the legal postal mail processing cart is stationary the inmate will be brought to the legal postal mail processing cart.
4) The staff member logging into the mail scanning station using credentials to identify the staff member.
5) The staff member searching for the recipient inmate by name or ID number to associate the upcoming scan with the inmate's account;
6) The institution personnel will scan the legal postal mail unique identifier and the inmate identifier and enter them into the legal postal mail computer tracking system. The inmate identifier could be, but not limited to, facial recognition, RFID identity card, RFID bracelet, Bluetooth® LTE, WI/FI or ZigBee® transmitter.
7) If the legal postal mail unique identifier and inmate identifier do not match, the mail will be returned to the mail receiving station for verification. If the unique identifier and the inmate identifier match, then the legal postal mail be opened by the inmate in front of the institution personnel.
8) legal postal mail will be scanned in front of the inmate by the institution personnel or by the inmate under the supervision of the institution personnel.

9) The inmate will compare the scanned legal postal mail and the legal postal mail.

10) After the inmate concurs with the scan legal postal mail of the legal postal mail the Bluetooth® LTE, WI/FI or ZigBee® transmitter, RFID and/or bar-code, or other technology equivalent, may or may not be removed by the institution staff and the mail will be bagged for storage or shredded.

11) The inmate will be provided access to the scan mail either through using their inmate identifier and the messaging system o a printed copy of scan.

FIG. 1 illustrates, in schematic form, an embodiment of a mobile legal postal mail processing station in the form of legal postal mail processing cart 10 suitable for use in a correctional facility. Legal postal mail processing cart is wheeled so that it may be moved by correctional facility staff so that it can be taken to the inmate's location, thereby avoiding the risks and complications of moving the inmate to a fixed legal postal mail processing station. Where moving the inmate is a viable option for the corrections facility, however, the same basic configuration may be used in a kiosk or station that is not on a mobile cart to create a fixed-location legal postal mail processing station.

Legal postal mail processing cart 10 comprises scanner 20. Scanner 20 may be a document scanner such as the Epson Workforce DS-510 Color Document Scanner. While any document scanner, may be used, in certain embodiments it is convenient for the scanner to be color (thereby allowing the scanning of communications that are not black and white) and to include a document feeder (either one-sided or two-sided) to enable automated scanning of multi-page communications. Optionally, it may also be, or include, a single-page flatbed scanner, which may be used for materials of a size that cannot be read by a document feeder. Wireless communication capability may also be desirable to allow scanner 20 to communicate with portable computer or tablet 30 (described below) without the need for cables.

Printer 40 may be any printer capable of printing the image captured by scanner 20. One possible printer that may be used is the HP LaserJet Pro M452nw Wireless Color Printer, but it will be understood that many other printers may be used. Where mobility is needed, both scanner 20 and printer 40 may be selected based on size and power usage needs. The less power required will result in a more robust system capable of processing more documents prior to recharging of power supply 80 (described further below), and the smaller the size will result in a more mobile Legal postal mail processing cart 10.

It will be understood that embodiments that do not require separate scanner 20 and printer 40 are also possible. For example, and without limitation, scanning and printing could be combined in a single multi-function device such as, without limitation, a Brother MFC9325CW Wireless Color Printer with Scanner, Copier & Fax, or simply a copier (not illustrated). One possible advantage of separating the scanner 20 and printer 40 into separate devices is that they can be separately controlled by a portable computer or tablet 30 such that the scanned image copy can be processed by portable computer or tablet 30 prior to, or in lieu of, printing. While it is possible that portable computer or tablet 30 may also separately control the scanning and printing of a single multi-function device, configuring it to control separate devices may reduce the likelihood that settings will be inadvertently changed on the multifunction device which will result in a more seamless implementation. This is possible because multifunction devices often include user interfaces that allow the user to reset the device configuration, whereas single purpose devices may not have such interfaces, or may have simpler interfaces with fewer settings available for configuration on the device itself. It should be noted, however, that where no record of the scanned image copy is to be uploaded to an inmate messaging system, a simple copier or a multifunction device set to a copy mode may be sufficient.

Portable computer or tablet 30 may be any computer such as a laptop computer or tablet computer or a smartphone or similar device. While a desktop computer or terminal may be used, due to power requirements, a tablet or laptop computer with an internal battery may be more convenient. One such tablet computer that may serve as portable computer 30 is the Samsung Galaxy Tab S 10.5-Inch Tablet (16 GB, Titanium Bronze). But it is understood that other tablets and portable computing devices may also be used. Portable computer 30 will preferably connect to scanner 20 and printer 40 wirelessly but may also optionally connect via USB or similar cables.

In one embodiment portable computer 30 is specially programmed to serve at least two functions: authentication/logging and review. The authentication/logging function enables the correctional facility to identify and log that a particular piece of legal postal mail 1 that is being delivered to an inmate. This may be done in a variety of ways including, without limitation, by the corrections officer entering the inmates name or identifier and receiving a list of pre-logged legal postal mail 1 to be delivered, locating the appropriate postal mail, and indicating that it has been provided to the inmate. Alternatively, the corrections personnel may simply enter the inmate name/identifying number and indicate that legal postal mail 1 was delivered without having had it pre-logged or selected from a list. As a still further alternative, the inmate may use optional fingerprint 60 or RFID card/wristband reader 61 that is operative connected with computer to identify himself or herself, after which tablet/portable computer 30 either displays a list of pre-logged legal postal mail 1 to be delivered or allows the correctional facility staff to indicate that legal postal mail 1 is being delivered. Similarly, an optional camera 32 on tablet/portable computer 30 could be used to identify the inmate via facial recognition, retinal scan or any other unique identifying characteristic, in the same manner as optional fingerprint or RFID card/wristband reader 61. Theoretically one could use a DNA match to insure the inmate's identity. Where portable computer or tablet 30 does not include optional camera 32, a separate camera 900 may be used. That separate camera 900 may be any camera capable of communicating with portable computer or tablet 30, such as, without limitation, a Logitech HD Laptop Webcam C615 with Fold-and-Go Design, 360-Degree Swivel, 1080 p Camera.

The particular item of legal postal mail 1 being delivered may or may not need to be specifically identified for logging purposes. If it does, then each item of legal postal mail 1 could be assigned a unique identifier during pre-processing (which may or may not take the form of a barcode sticker capable of being read by portable computer or tablet 30 or a number printed or written on the outside of the postal mail, an RFID label, a Bluetooth® LTE, WiFi or ZigBee transmitter, or any technology equivalent. Alternatively, or in addition, the legal postal mail 1 may be photographed by portable computer 30 of the mail and/or the inmate at the time of delivery to provide a record of what was delivered and what time it was delivered. The software on the computer or tablet 30 would be enabled to take the required pictures and store them in the delivery record with the time and date stamp. The authentication/logging function may be completed by either storing the information in portable computer 30 for later printing or transfer to another database or system, or by wirelessly transmitting such information to a database or system such as an inmate messaging system, where it can be combined with other information previously gathered when the postal mail was initially processed.

For the review function, portable computer 30 may be specially programmed to trigger scanner 20 and receive an image from scanner 20. Alternatively, scanner 20 may be triggered independently and portable computer or tablet 30 may receive the scanned image copy. The inmate will then review the scanned image copy and determine if the image is clear and complete, or if it needs to be re-scanned. Once the inmate has confirmed the image, he or she may optionally acknowledge the scan via a signature (e.g. with their finger on a touch screen of portable computer 30), through facial recognition, or via optional fingerprint or RFID card/wristband reader 61 in the event the inmate refuses to acknowledge, the corrections personnel may note that refusal on portable computer 30 at the time and initiate an override protocol to close the transaction.

For certain correctional facilities it may be preferred that the correctional facility staff have as little physical contact with the legal postal mail 1 as possible, including for safety reasons or compliance reasons. In such environments, logging and review functions in one embodiment may be accomplished as follows:

a) an inmate would be asked to login to an inmate messaging system using portable computer 30, just as the inmate would otherwise login to receive messages. If the messaging system required a fingerprint or an RFID card/wristband to log in, then finger print or RFID card/wristband scanner 60 would be used, or a scanner integrated into portable computer 30 would be used. If login was by facial recognition, then camera 32 or a separate camera 900 could be used. Otherwise a password, PIN or pattern could be entered on portable computer 30, in the same manner in which the inmate would otherwise login to the messaging system.

b) The inmate would then open and scan or copy the legal postal mail 1, for example with scanner 20, as is otherwise described herein. Verification of the scan (via portable computer or tablet 30) or review of the printout would confirm that legal postal mail 1 had been properly scanned. Since the scanning was done while the inmate was logged in, the scan would be associated with the inmate's account. The messaging system would record that it was legal postal mail 1 based on the user interface presented to the inmate for this process. The fact that inmates otherwise do not typically upload scanned mail to the messaging system is handled by the software on computer or tablet 30 so that it is noted and recorded that it is a legal postal mail transaction.

c) The inmate would then shred the legal postal mail 1 via shredder 70 or place the legal postal mail into a secure property storage bag and log out of the messaging system using portable computer or tablet 30.

Through this process, the messaging system records that legal postal mail 1 was delivered to that inmate at that time. The fact that the inmate was able to login to the messaging system identifies that the legal postal mail 1 was delivered to the correct inmate. The logging process is thereby accomplished with a minimal amount of work by correctional facility staff, and with a minimum of handling of the legal postal mail 1. If the specific legal postal mail 1 delivered needs to be identified, the envelope or packaging of the legal postal mail 1 could be scanned or uploaded via a photograph taken by portable computer 30. In such embodiments the messaging system may provide a simple, specialized user interface specific to the processing of legal postal mail 1 in the manner described.

It will be understood that portable computer 30 may be separated from legal postal mail processing cart 10 and handed to the inmate or may be secured to legal postal mail processing cart 10 in a position in which the inmate can view it easily, but corrections personnel cannot. Where it is to be handed to the inmate, it may be disconnected (in which case it will communicate wirelessly with other devices on legal postal mail processing cart 10) or may be connected to such devices with cables. Portable computer 30 may also, for security reasons, be attached to legal postal mail processing cart 10 by a cable. In addition, it will be understood that optional fingerprint reader 60 may be any compatible fingerprint scanner or RFID card/wristband reader, including without limitation a fingerprint or RFID card/wristband scanner integrated into portable computer 30.

Optionally, the legal postal mail processing cart 10 camera 32 or a separate camera 900 could be used record the complete transaction using computer or tablet 30 which would consist of opening legal postal mail 1, scanning legal postal mail 1 contents and envelope, the verification of the scan image copy by the inmate and the shredding of legal postal mail 1 by the inmate as a record of the mail being delivered and processed so the inmate can have access to the information contained in the legal postal mail 1 communication. This feature could be used in addition to the authentication/logging function or as a secondary confirmation step that the mail was appropriately delivered and copied per the correctional facilities protocol. The video would be stored in the appropriate correctional facilities database.

As has been noted, in certain embodiments, the legal postal mail 1 may be printed on printer 40 and left with the inmate. In such embodiments, portable computer or tablet 30 need only provide the authentication/logging function previously described or, if no authentication/logging function is required, portable computer or tablet 30 need not be included or used at all, as in the case of a copier-based system as opposed to a scanner-based system.

Where a scanned image copy of the legal postal mail 1 is stored for later access by the inmate on an inmate messaging system such as is described in U.S. application Ser. No. 15/153,171, (the content in its entirety is incorporated herein by reference), portable computer or tablet 30 may connect with a wireless network to transfer the data in real time, or may store the data for later transfer via a network (wireless or wired ethernet), or via USB or similar hardware storage media. Where transmission via wireless network is used, portable computer or tablet 30 may include an internet wireless networking capability or may connect via an optional WiFi access point 70 (which may suitably be a NETGEAR R6080-100NAS-AC1000 Dual Band Wi-Fi Router or similar device). Alternatively, it may connect through a cellular hotspot device such as a Verizon MiFi Jetpack 4620L Verizon Wireless Wi-Fi 4G LTE Hotspot Modem or similar device. Such devices can be convenient where signal strength is not sufficient for portable computer or tablet 30 internal WiFi capability to communicate with the correctional facilities network, where portable computer or tablet 30 is not WiFi capable, or where special security or network requirements necessitate the use of a separate wireless access point or router.

Once the legal postal mail 1 has been printed and/or scanned and stored, the inmate will dispose of the original copy of the legal postal mail 1 by shredding it using shredder 70. The Royal Sovereign AFX-975 Auto Feed Shredder, or any other appropriate shredder may be used. For security purposes, a confetti shredder is preferred to a strip shredder. In certain embodiments a combined scanner/shredder may be used in which the documents are shredded immediately after scanning. Such embodiments require the scanner 20 to be highly reliable, however, as scanning failures cannot be corrected by re-scanning the document when it is shredded automatically. Having the inmate acknowledge receipt or accurate scanning prior to shredding provides evidence of proper delivery of the legal postal mail.

An alternative to shredding the document would be for the inmate or staff member to place the scanned legal postal mail into a secure inmate property bag for secure storage.

Power supply 80 may provide power to those components on legal postal mail processing cart 10 that do not use their own internal batteries, which will typically include printer 40, scanner 20, shredder 70 and WiFi access point 70. It will be understood that fingerprint 60 or RFID card/wristband reader 61 and a separate camera 900 could receive power from either power supply 80 or directly from portable computer or tablet 30 via a USB or similar cable.

Power supply 80 may be a single, integrated unit such as a MINUTEMAN BP36RTXL (1164)-Extended Battery Pack or similar device or it may comprise separate components depending on the power needs of the devices in use. In either event power supply 80 will comprise a battery 84 and a power transformer or inverter 86 capable of meeting the power requirements (voltage and amperage) of the selected devices.

Shelving 90 may optionally be included as well to provide storage for the legal postal mail 1 to be distributed and/or supplies such as paper and printer ink. For security purposes, it may be convenient to enclose shelving 90 in a locking cabinet.

Through this process, the inmate will either be able to view a secure, scanned image of the legal postal mail 1 on an inmate messaging system or will have a paper copy of the legal postal mail 1. In either event, any contraband in the legal postal mail 1 will have been destroyed or rendered inaccessible by the shredding or property storage process. Where the scanned image copy is stored for display in the inmate messaging system, portable computer or tablet 30 will transmit the scanned image copy with data and commands sufficient for it to be stored in a manner that the inmate messaging system will not allow it to be displayed to corrections facility personnel.

As is referenced above, it will be understood that the legal postal mail processing station may be either mobile as described in connection with the description of legal postal mail processing cart 10 or a fixed kiosk or station using similar components, but in a fixed location and without the need of power supply 80. The legal postal mail processing station may also contain any of the following additional hardware and associated software viewing software 92, printing software 93, portable storage medium docking device 91 such as USB connector or SD card reader and DVD/CD burner and reader 94.

Figure 2:
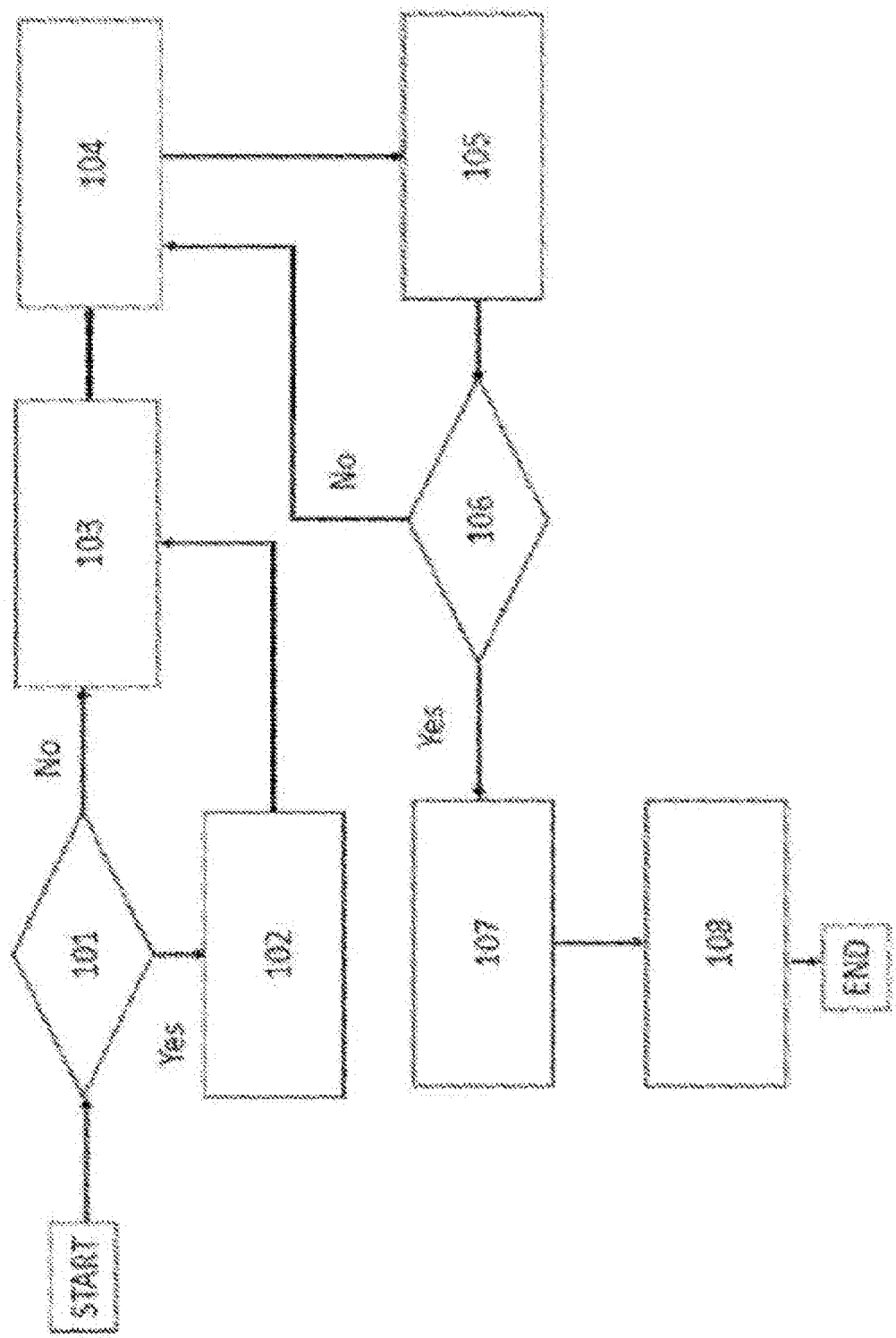
FIG. 2 illustrates a flow chart of the processing of legal postal mail in an embodiment of a legal postal mail processing station utilizing a copier.

FIG. 2 illustrates a method of using the system previously described, in which the inmate retains a paper copy of the legal postal mail 1. In step 101 it is determined if logging is required.

In step 102 (corrections personnel log delivery on paper or electronically) the corrections personnel may log the delivery of the legal postal mail to the inmate on paper or using portable computer or tablet 30 (which need not be portable in the event a fixed kiosk or station is used instead of a portable cart), and/or optional fingerprint or RFID card/wristband reader 60 as has been previously described.

Next the staff member logs in to the mail scanning station using credentials to identify the staff member. The staff member searches for the recipient inmate by name or inmate identifier to associate the documents to be scanned with the inmate's account;

In step 103 provide legal postal mail 1 to inmate, the inmate is proximal to the processing cart 10, the legal postal mail is provided to the inmate who opens and copies it in step 104 inmate opens and copies legal postal mail 1. Here it is apparent that if only a paper copy is needed a copier, or a multifunction device may be used in lieu of separate scanner 20 and printer 40. The inmate then verifies the copy in step 105 (copy 1) inmate verifies copy. If the inmate determines in step 106 that the copy is not accurate or complete, a new copy is made in step 104 (copy 2) and the copy 1 can be shredded. The process can be repeated until a readable copy is created in step 104. If the copy 1 or 2 is accurate, the inmate then shreds the legal postal mail step 107 and retains the copy which is now contraband free in step 108 and inmate retains copy.

Figure 3:
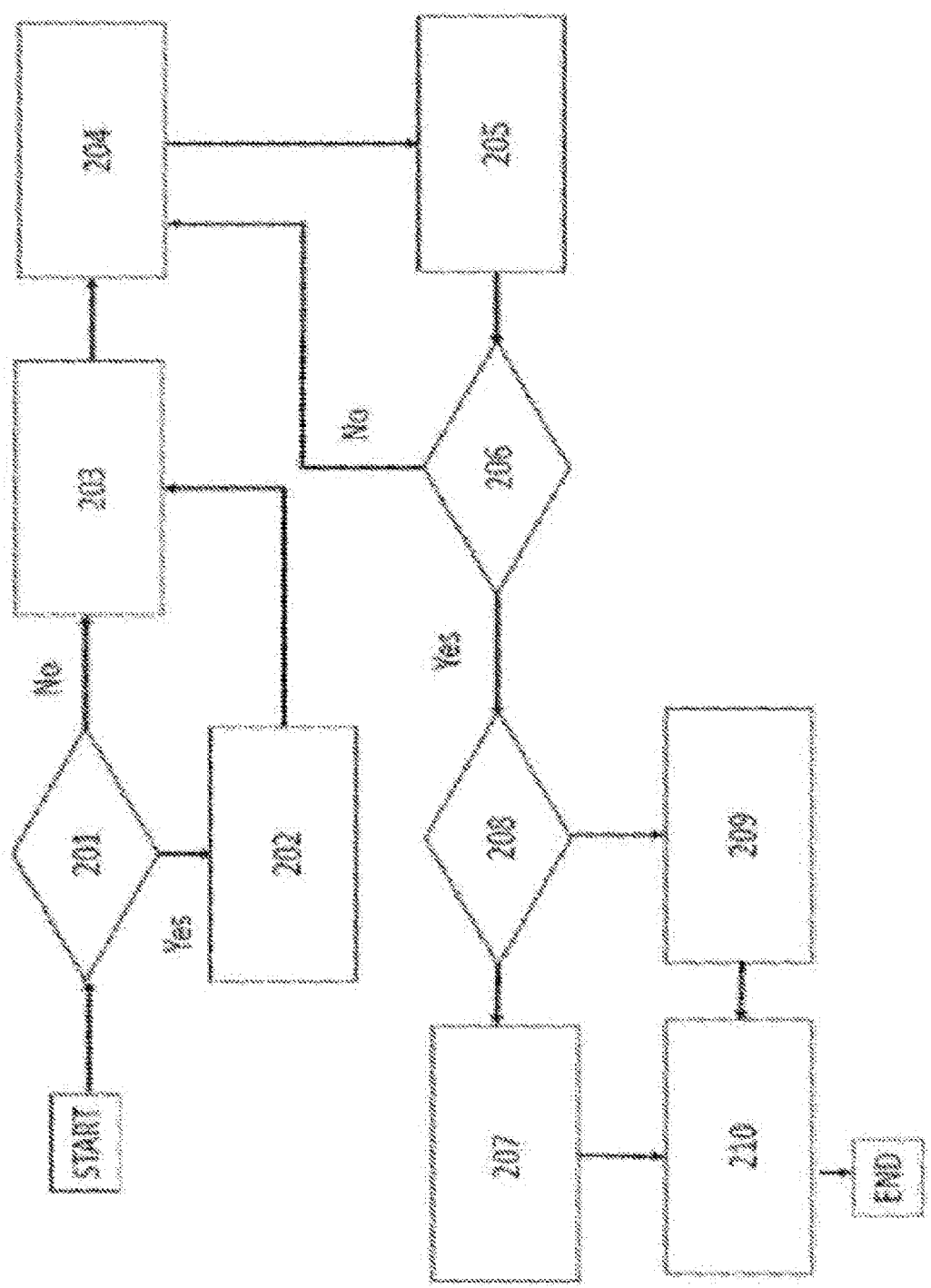
FIG. 3 illustrates a flow chart of the processing of legal postal mail in an embodiment of a legal postal mail processing station utilizing a seamier, an electronic inmate messaging system, and an optional printer.

Likewise, FIG. 3 illustrates a method of using the system previously described in which the legal postal mail 1 is scanned, and the scan is stored on an inmate messaging system. In step 201 (is logging required), it is determined if logging is required. This may be done as a matter of institutional policy or as a matter of choice by correctional personnel on a unit-by-unit, or inmate-by-inmate basis. But it is likely that it will be determined as a matter of institution policy. If so, in step 202 (corrections personnel log delivery on paper or electronically) the corrections personnel may log the delivery of the legal postal mail 1 to the inmate on paper or using portable computer or tablet 30 (which need not be portable in the event a fixed kiosk or station is used instead of a portable cart), and/or optional fingerprint or RFID card/wristband reader 60 as has been previously described. In step 203 (provide legal postal mail 1 to inmate), the legal postal mail is provided to the inmate who opens and scans it in step 204 (inmate opens and copies legal postal mail 1) using scanner 20 or a multifunction device (not illustrated) as previously described. The inmate then verifies the scanned image copy in step 205 (inmate verifies scanned image copy). If the inmate determines in step 206 (is scanned image copy accurate) that the scanned image copy is not accurate or complete, a new scanned image copy is made in step 204. If allowed by the institution, the inmate may be given an option in step 208 (inmate given option to print scanned image copy) to print a copy of the scanned image copy and retain it. If the inmate elects to do so, the scanned image copy can be printed by printer 40 in step 209 (print copy) and retained. If the scan is accurate or the inmate has printed the scanned image copy, the inmate then shreds the original and step 207. In either event, portable computer or tablet 30 will have transmitted the scanned image copy of the legal postal mail 1 to an inmate messaging system that will allow the inmate to view the scanned image copy at a later time in step 210 (inmate views scanned image through messaging system). More information about the design and operation of an appropriate inmate messaging system is available in U.S. application Ser. No. 15/153,171, previously incorporated by reference.

Figure 4:
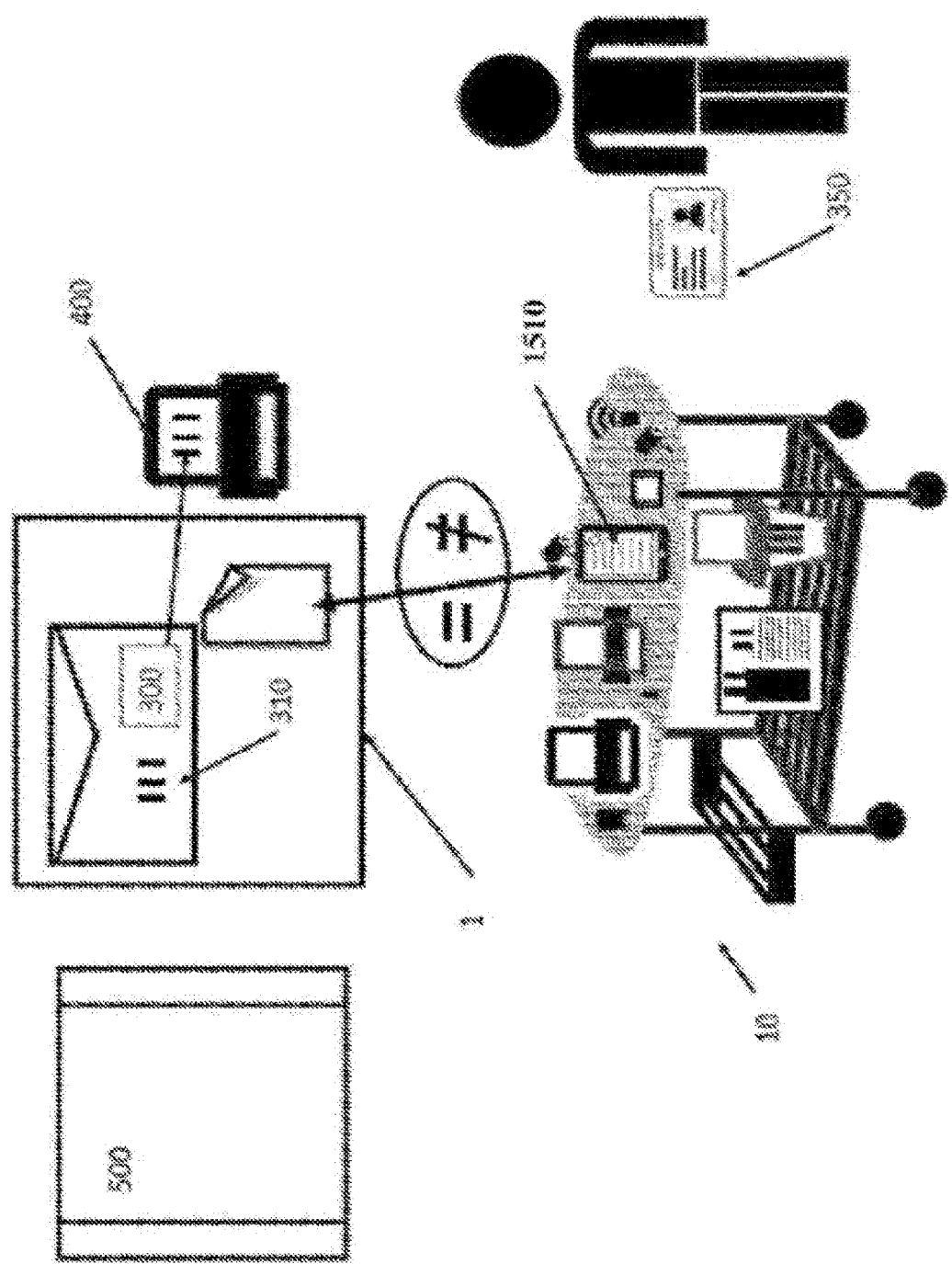
FIG. 4 illustrates embodiment of the invention that utilizes a legal postal mail tracking device.

Referring to FIG. 4 which presents an alternate embodiment that utilizes a legal postal mail tracking device and which provides for a unique identifier for each piece of legal postal mail. The identifier is placed on the legal postal mail once it is identified by the staff as legal postal mail. This provides a unique identifier for the legal postal mail and insures that there is proper handling of the mail. The unique identifier could be in any form that allows electronic tracking so that the mail is easily identifiable as legal postal mail. The following is a brief description of the process utilizing the unique identifier to track legal postal mail within the facility and insure that the mail is delivered expeditiously to the correct inmate. The process could utilize the following steps:

1) When legal postal mail 1 has been identified at the mail receiving station 500 as legal postal mail it is assigned a unique identifier id 300 which has a corresponding RFID and/or bar code 310. Alternatively, the institution could also use a Bluetooth® LTE, WiFi or ZigBee® transmitter as the unique identifier and the address or id for that transmitter would be associated with the particular piece of mail.

2) The unique identifier id 300 is then associated with the legal postal mail 1 and the inmate identifier which is associated with the inmate who the legal postal mail 1 is addressed to by entering it in a legal postal computer tracking system 400 which must be accessible from the legal postal mail processing cart.

3) The legal postal mail 1 and the legal postal mail processing cart 10 will be taken to the inmate or if the legal postal mail processing cart 10 is stationary the inmate will be brought to the legal postal mail processing cart 10.

4) The staff member logs in to the mail scanning station using credentials to identify the staff member.

5) The institution personnel will scan the mail unique identifier 300 and the inmate identifier 350 and enter them into the legal postal mail computer tracking system. The inmate identifier 350 could be facial recognition, RFID identity card, RFID bracelet, Bluetooth® LTE, WiFi or ZigBee® transmitter.

6) If the legal postal mail unique identifier 300 and inmate identifier 350 do not match the mail will be returned to the mail receiving station 500 for verification. If the unique identifier 300 and the inmate identifier 350 match, then the legal postal mail 1 will be opened by the inmate in front of the institution personnel.

7) The legal postal mail 1 will be scanned in front of the inmate by the institution personnel or by the inmate under the supervision of the institution personnel.

8) The inmate will compare the scanned mail 1510 and the legal postal mail 1.

9) After the inmate concurs with the scan mail 1510 of the legal postal mail 1 the Bluetooth® LTE, WiFi or ZigBee® transmitter, RFID and/or bar code can be removed by the institution staff if required by the institution protocol, else it can stay with the mail and the mail will be bagged for storage or shredded.

10) The inmate will be provided access to the scanned mail 1510 either through using their inmate identifier and the messaging system of given a printed copy of scan mailed 1510.

Alternatively, the system can be simplified to consist of:
a) a copier;
b) a shredder;
c) a power supply;

all mounted on a portable cart of a fixed work station; wherein corrections personnel can provide legal postal mail to the inmate; wherein the inmate can copy the legal postal mail with the copier and then shred the legal postal mail with the shredder and retain only the copy of the legal postal mail.

Figure 5:
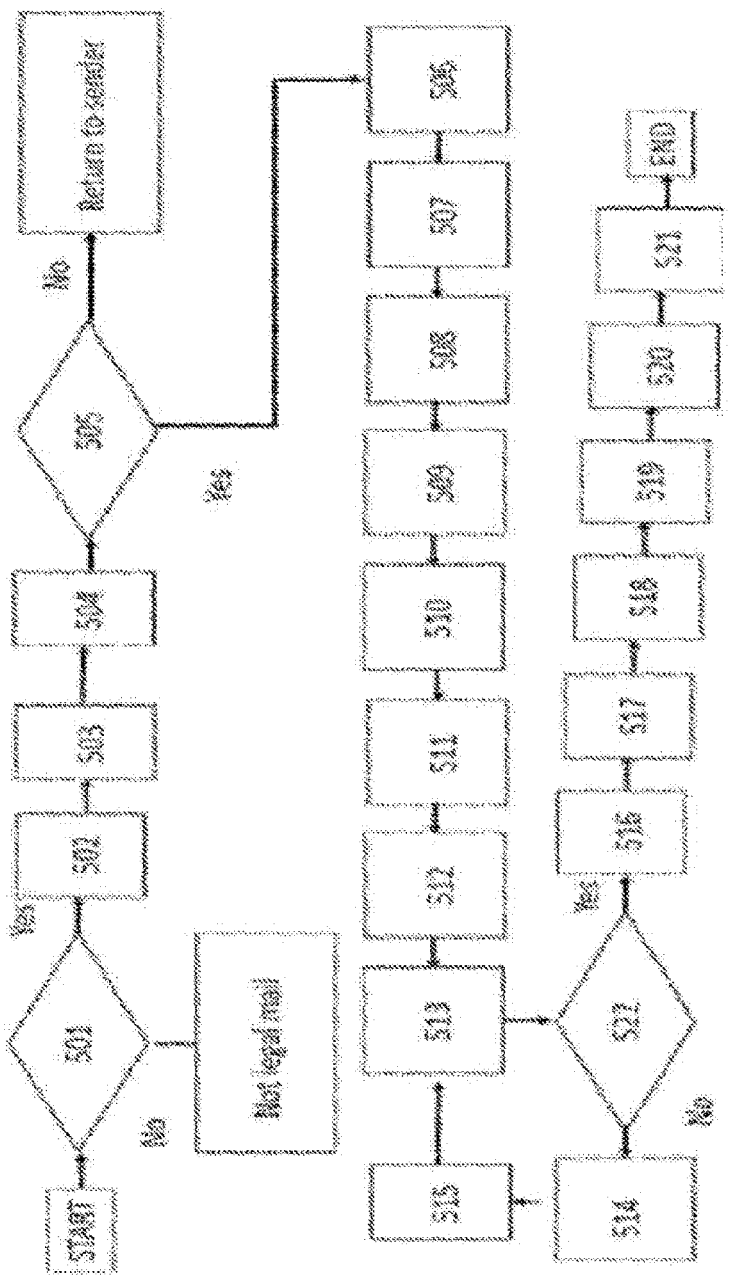
FIG. 5 illustrates a flow chart of the processing of legal postal mail in an embodiment of a legal postal mail processing station utilizing a scanner, an electronic inmate messaging system, and transmitting the scan image to a central database.

Referring to FIG. 5 a flow chart of the processing of legal postal mail in an embodiment of a legal postal mail processing station utilizing a scanner, an electronic inmate messaging system, and transmitting the scan image to a central database for eliminating contraband in legal postal mail for a correctional institution while retaining the privacy of legal mail comprises of the steps:

a. Receiving postal mail at the correctional facility and determining that it qualifies as legal mail Step 501;

b. Identifying mail information of each piece of legal postal mail comprising recipient inmate name and inmate identifier Step 502 and;

c. Identifying legal postal mail sender Step 503;

d. At correctional institution verify that the recipient inmate name and inmate identifier are valid and are active, in-custody, and eligible to receive legal postal mail Step 504;

e. If the inmate is not valid, has been released, transferred, or is otherwise unable to receive legal postal mail as addressed, it may be returned to sender by the facility Step 505;

f. At institution using a legal postal mail scanning station for use by staff member or the inmate under staff member supervision Step 506;

g. Legal mail scanning station comprising a scanner, a computer with a first camera and display, a shredder, a second camera and a printer; staff member logging in to the mail scanning station using credentials to identify the staff member Step 507.

h. Staff member searching for recipient inmate by name or inmate identifier to associate the documents to be scanned with inmate's account Step 508;

i. Provide legal postal mail to inmate identified by inmate identifier at inmate institution, inmate being proximal to mail scanning station and said first camera recording a picture of said inmate Step 509;

j. Inmate or staff member entering the name of the sender from legal mail Step 510;

k. Second camera begins to record a video of the scanning process Step 511;

l. Inmate opening the legal mail associated with the recipient inmate name and the inmate identifier Step 512;

m. Inmate scanning legal mail using a scanner attached to computer on mail delivery station to create a scanned image copy 1 for review and on a computer attached to the scanner Step 513;

n. Inmate verifying that scanned image copy 1 from computer on mail delivery station is readable Step 522;

o. If scanned image copy 2 is not readable Step 522 then inmate deletes scanned image copy 1 Step 514, inmate rescans Step 515 the legal mail using the scanner to create a scanned image copy 1, inmate repeats steps m and n until scan copy 1 is readable;

p. If the scanned image copy 1 is readable then the inmate approves the scan and stores the scanned image copy 1 Step 516 on computer memory attached to the scanner on the mail scanning station as scan image copy;

q. The video recorded by the second camera of steps 511-516 being uploaded to a central server for storage and later retrieval Step 517;

r. The inmate printing scan image copy Step 518;

s. The inmate shredding legal mail Step 519;

t. Transmitting scanned image copy and storing scanned image copy using an electronic transmission method from the computer on legal postal mail scanning station to recipient inmate via institution messaging system, inmate being identified in messaging system by inmate identifier Step 520;

u. wherein the risk of recipient inmates receiving contraband in legal mail is essentially eliminated Step 521.

The second camera and the steps associated with the second camera are optional and some correctional institutions will not use or have a second camera to record videos of the inmate opening and scanning legal postal mail.

The electronic transmission method can be selected from the group consisting of, but not limited to, Bluetooth®, Zigbee®, WiFi, 3G, 4 G and 5 G wireless mobile telecommunications technology, radio frequency, telephonic modem signals and wired ethernet internet.

The legal mail scanning station is configured such that the computer is adapted to store a log of the delivery and copying of the legal postal mail.

Once the legal postal mail has been scanned and transmitted to the inmate messaging system the inmate can then access the scanned legal mail using the inmate messaging system. In most cases the access to the scanned legal mail will require the inmate to enter a second, additional, or different password, or use biometrics such as an iris scan, fingerprint scan or facial recognition, to enable access to the copy of legal mail delivered through the inmate messaging system. The inmate messaging system can be any of the following electronic access systems as an email system, electronic kiosk, tablet computer, computer system or messaging system.

Figure 6:
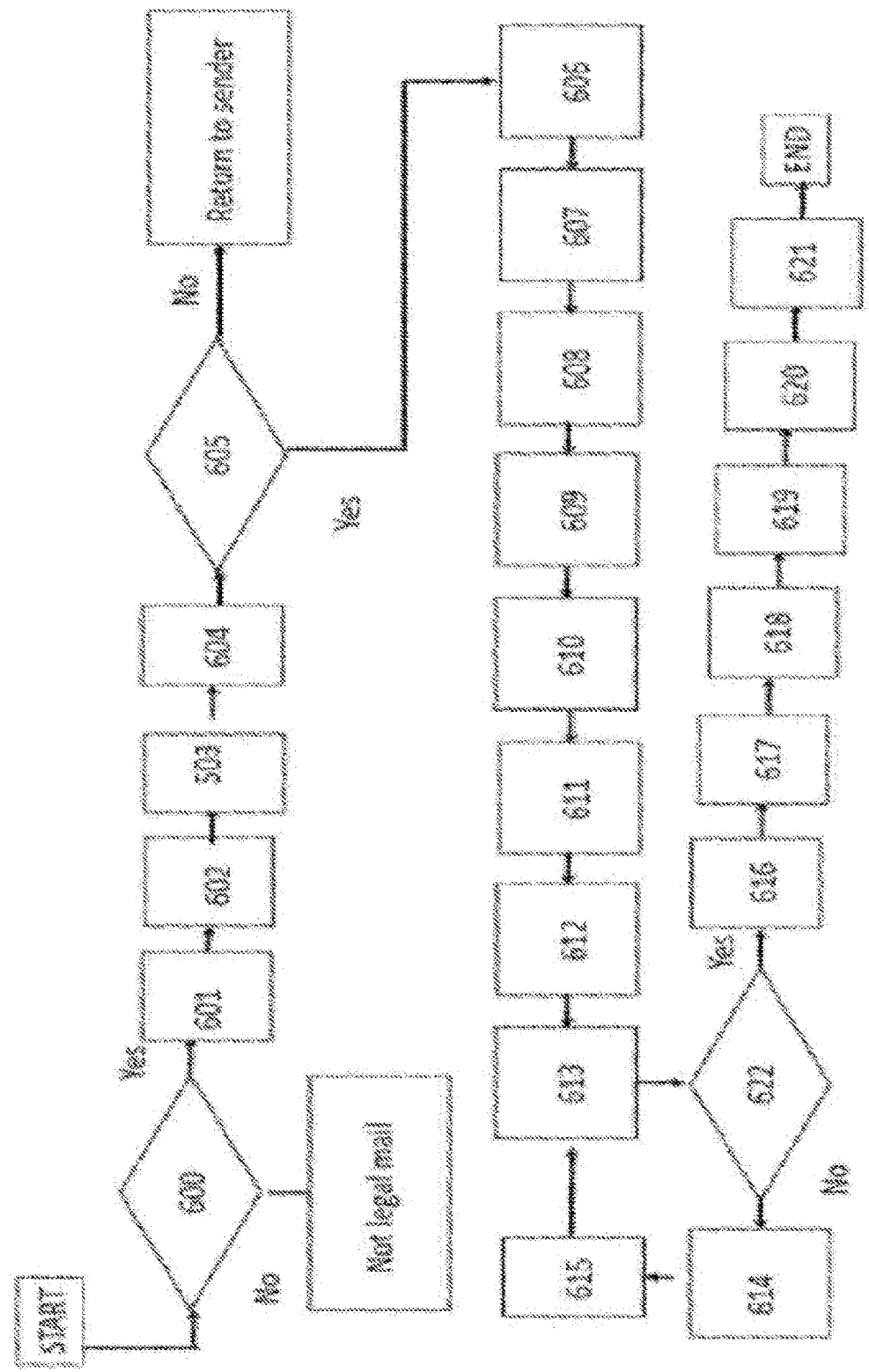
FIG. 6 illustrates a flow chart of the processing of legal postal mail received at a central processing facility in an embodiment of a legal postal mail processing station utilizing a scanner, an electronic inmate messaging system, and transmitting the scan image to a central database.

Referring to FIG. 6 a flow chart of the processing of legal postal mail received at a central processing facility using an embodiment of a legal postal mail processing station utilizing a scanner, an electronic inmate messaging system, and transmitting the scan image to a central database for eliminating contraband in legal postal mail for a correctional institution while retaining the privacy of legal mail comprises of the steps:

a. Receiving postal mail at the processing facility and determining that it qualifies as legal mail Step 600;

b. Separate legal postal mail from non-legal postal mail and place legal postal mail in legal postal mail queue and place non-legal postal mail in non-legal postal mail queue, separating legal postal mail queue by correctional institution, and sending the legal postal mail to each correctional institution Step 601;

c. At the correctional institution identifying mail information of each piece of legal postal mail comprising recipient inmate name and inmate identifier Step 602 and;

d. Identifying legal postal mail sender Step 603;

e. At correctional institution verify that the recipient inmate name and inmate identifier are valid and are active, in-custody, and eligible to receive legal postal mail Step 604;

f. If the inmate is not valid, has been released, transferred, or is otherwise unable to receive legal postal mail as addressed, it may be returned to sender by the facility Step 605;

g. At institution using a legal postal mail scanning station for use by staff member or the inmate under staff member supervision Step 606;

h. Legal mail scanning station comprising a scanner, a computer with a first camera and display, a shredder, a second camera and a printer; staff member logging in to the mail scanning station using credentials to identify the staff member Step 607.

i. Staff member searching for recipient inmate by name or inmate identifier to associate the documents to be scanned with inmate's account Step 608;

j. Provide legal postal mail to inmate identified by inmate identifier at inmate institution, inmate being proximal to mail scanning station and said first camera recording a picture of said inmate Step 609;

k. Inmate or staff member entering the name of the sender from legal mail Step 610;

l. Second camera begins to record a video of the scanning process Step 611;

m. Inmate opening the legal mail associated with the recipient inmate name and the inmate identifier Step 612;

n. Inmate scanning legal mail using a scanner attached to computer on mail delivery station to create a scanned image copy 1 for review and on a computer attached to the scanner Step 613;

o. Inmate verifying that scanned image copy 1 from computer on mail delivery station is readable Step 622;

p. If scanned image copy 1 is not readable Step 622 then inmate deletes scanned image copy 1 Step 614, inmate rescans Step 615 the legal mail using the scanner to create a scanned image copy 1, inmate repeats steps o and p until scan copy 1 is readable;

q. If the scanned image copy 1 is readable then the inmate approves the scan and stores the scanned image copy 1 Step 616 on computer memory attached to the scanner on the mail scanning station as scan image copy;

r. The video recorded by the second camera of steps 611-616 being uploaded to a central server for storage and later retrieval Step 617;

s. The inmate printing scan image copy Step 618;

t. The inmate shredding legal mail Step 619;

u. Transmitting scanned image copy and storing scanned image copy using an electronic transmission method from the computer on legal postal mail scanning station to recipient inmate via institution messaging system, inmate being identified in messaging system by inmate identifier Step 620;

v. wherein the risk of recipient inmate receiving contraband in legal mail is essentially eliminated Step 621.

The second camera and the steps associated with the second camera are optional and some correctional institutions will not use or have a second camera to record videos of the inmate opening and scanning legal postal mail.

The electronic transmission method can be selected from the group consisting of, but not limited to, Bluetooth®, Zigbee®, WiFi, 3G, 4G and 5G wireless mobile telecommunications technology, radio frequency, telephonic modem signals and wired ethernet internet.

The legal mail scanning station is configured such that the computer is adapted to store a log of the delivery and copying of the legal postal mail.

Once the legal postal mail has been scanned and transmitted to the inmate messaging system the inmate can then access the scanned legal mail using the inmate messaging system. In most cases the access to the scanned legal mail will require the inmate to enter a second, additional, or different password, or use biometrics such as an iris scan, fingerprint scan or facial recognition, to enable access to the copy of legal mail delivered through the inmate messaging system. The inmate messaging system can be any of the following electronic access systems as an email system, electronic kiosk, tablet computer, computer system or messaging system.

The inventive system and method (hereafter sometimes referred to more simply as "system" or "method") described herein identifies and tracks private mail in a correctional facility, such as legal postal mail, also referred to herein as legal mail, privileged mail, medical related mail, or other mail where privacy should be retained. Specifically, the invention utilizes software to validate senders and provide them with unique identification numbers for each piece of private mail they send to a correctional facility. The senders receive unique identifiers for each piece of private mail which contain information about the sender and recipient. The unique identifier is affixed to the outside of the mail. When the labeled mail is received by the correctional facility, the correctional facility can use the label to validate the mail. Once the correctional facility determines that the mail is validated, it does not need to be opened in front of the inmate and can be distributed to the inmate sealed. The inventive system described herein reduces the time senders take to mail private mail to their recipients in correctional facilities, limits delivery errors, retains information about mail used in corrections facilities, and ensures privacy is maintained for communications between sender and recipient/inmate.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

Generally, in accordance with one exemplary embodiment of the inventive system, a sender who wishes to send private mail to an inmate, may log-into or register for a private sender account using his or her user device(s). As used herein, a sender could be anyone who wishes to send private mail, including, for example, but not limited to an attorney, a representative of an attorney, a medical professional, etc. The term "sender" generally refers to anyone who may wish to send private mail to an inmate at a correctional facility. Moreover, the terms "prisoner" and "inmate" are used synonymously here and generally refer to anyone who may be incarcerated or temporarily housed in a limited access system. The terms "prison" and "correctional facility" are also used synonymously and not intended to be limiting; they refer generally to any detention center that houses individuals in connection with the applicable criminal process and criminal justice system, and includes, but is not limited to federal, state, and local agency facilities. Private mail, as used herein, refers generally to any type of mail intended or purported to contain private communication and may have some restrictions around who may view the communication. Private postal mail includes—but is not limited to—attorney-client privileged communication, doctor-patient confidential communication, and the like. As described above private postal mail may also be referred to as as private mail, legal postal mail, legal mail, privileged mail, etc.

The mail system may register the sender after the sender's privacy status is verified (i.e. the sender's ability to send private postal mail is verified). For example, if the sender is an attorney, the mail system may verify the attorney's identity and/or verify the attorney's ability to send legal postal mail by, for example, querying a state bar database. Once verified, the mail system may generate a profile for the sender along with authentication data such as a username and password. The sender may then, subsequently, use the authentication data to obtain a unique mail identifier that can be affixed to private postal mail. The unique mail identifier may be comprised of additional data that, separately and/or collectively, may be used by a correctional facility to sort private postal mail and to ensure that privacy remains intact regardless of the processing and/or digitization system that is used. Additionally, the mail identifier may be used to perform additional checks to aid in identifying instances when private postal mail is sent by someone other than the sender who has registered with the mail system, and/or when private postal mail may likely include communication that is causing or promoting criminal acts.

Figure 7:
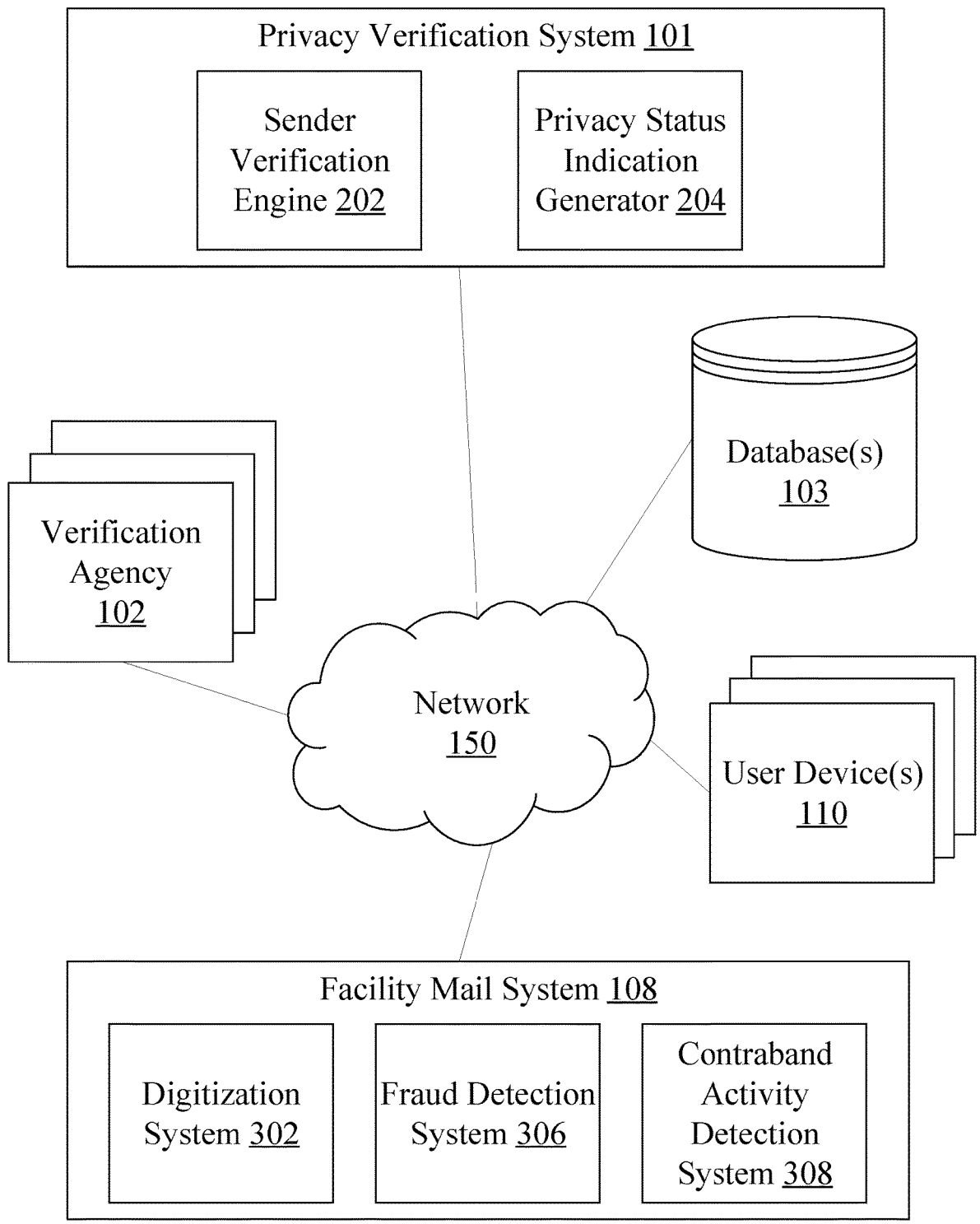
FIG. 7 illustrates, in accordance with an exemplary embodiment of the invention, various elements of a system for processing and verifying private mail that is sent to an inmate at a correctional facility.

Now referring to FIG. 7, which illustrates a system architecture embodying the present invention—it may be comprised of a privacy verification system 101 (which may be further comprised of a sender verification engine 202 and privacy status indication generator 204), verification agency 102, database(s) 103, facility mail system 108 (which may be further comprised of digitization system 302, contraband activity detection system 308, fraud detection system 306), user device(s) 110, and network 150. The various components enable a sender to send private postal mail, and enable verification and additional analysis to ensure that privacy remains intact and/or mail is not improperly used to conduct or promote criminal activity. The various computing devices described herein are exemplary and for illustration purposes only. The system may be reorganized or consolidated, as understood by a person of ordinary skill in the art, to perform the same tasks on one or more other servers or computing devices without departing from the scope of the invention. For example, the system may be a stand-alone system or fully or partially integrated into the legal postal mail processing station discussed above.

The privacy verification system 101, in accordance with an embodiment of the invention, verifies the identity of the sender and/or verifies the privacy status of the sender (i.e. determine whether the sender can send private postal mail (i.e. whether the sender has theoretical ability to send private postal mail). In one embodiment, the privacy verification system 101 receives information about the sender from a user device 110 and/or from other sources related to the user's device 110 such as the user's IP address, etc. More specifically, as described in greater detail below, the privacy verification system 101 may be comprised of a sender verification engine 202 that may verify whether the sender is permitted to send private postal mail. A variety of different verification methodologies may be used, as would be apparent to a person of ordinary skill in the art, without departing from the scope of the invention, including, but not limited to determining whether the sender provided information matches information that may be available in one or more other databases 103 and/or as verified by a verification agency 102, etc.

Additionally, as described in greater detail below, the privacy verification system 101 may be comprised a privacy status indication generator 204, which verifies whether the sender is permitted to send private postal mail and generate an identifier that, when affixed to mail, signals that a piece of mail should be treated as private by, for example, a correctional facility. A variety of identifiers may be generated, as would be apparent to a person of ordinary skill in the art, without departing from the scope of the invention, including, but not limited to QR codes, bar codes, etc.

The database(s) 103, in accordance with an embodiment of the invention, may be comprised of data that may be associated with a sender (e.g. a sender who is permitted to send private communication such as an attorney or medical professional). A variety of different public and/or private databases may be used, including, but not limited to, for example, state bar databases, federal and state court databases, federal bar databases, medical professionals databases, department of motor vehicles database, etc. In one embodiment, the privacy verification system may query the database(s) 103 to aid in determining whether the sender is in fact permitted to send private postal mail. In other embodiments, the database(s) 103 may push data to the privacy verification system 101, which enables the privacy verification system 101 to determine whether the sender is permitted to send private postal mail.

In one embodiment, a verification agency 102 may provide verification services, which enable the privacy verification system 101 to determine whether a sender is permitted to send private postal mail. A verification agency 102 may maintain one or more databases and/or query database (s) 103. Moreover, the verification agency 102 may employ human reviewers to ensure that the sender is permitted to send private postal mail. In one embodiment, the verification agency 102 may provide the verification results to the privacy verification system 101.

If a sender's privacy status is verified, the privacy verification system 101 may generate a privacy identifier that, if affixed to a postal mail, may indicate that a piece of mail should be treated as private. The term affixed, as used herein, is used generally and does not require physical adherence; rather, any method of transferring the identifier and/or information associated with the identifier, may be used without departing from the scope of the invention, including, for example, printing the identifier on a postal mail envelope, writing the identifier on a postal mail envelope, stamping the identifier on a postal mail envelope, etc. In one embodiment, the privacy verification system 101 may record various data associated with the identifier, including, for example, date and/or time that the identifier was generated, location of computing device from where the identifier was requested, etc.

If a privacy identifier is detected, the facility mail system 108 may perform some additional processing to ensure that privacy remains intact. Generally, facility mail system 108 refers to a mail handling system that is associated with a correctional facility. The facility mail system 108 may be operated by the correctional facility staff and/or may be operated by a vendor and/or a group of vendors that process mail for correctional facility. In one embodiment, the facility mail system 108 employs a digitization system 302 for digitizing contents of mail and enabling inmates to view digital versions of mail sent to them. Generally, digital mail is a preferred method for enabling inmates to view postal mail because it reduces the risk that contraband that is placed or hidden within postal mail may be delivered to the inmate. The presence of a privacy identifier on private postal mail signals to the facility mail system 108 that the mail should not be opened and its contents should not be digitized in an effort to maintain privacy on the mail.

In one embodiment, the facility mail system 108 may perform some additional processing when private postal mail with an identifier is received. Generally, the fraud detection system 306 may perform additional processing to help determine whether a sender may be disguising non-private postal mail as private postal mail. In one embodiment, the contraband activity detection system 308 may identify the likelihood that private postal mail may be used to commit a crime or incite violence. As illustrated in FIGS. 2 and 3, the fraud detection system 306 and the contraband activity detection system 308 may be embodied in the privacy verification system 101 and/or the facility mail system 108.

User device(s) 110 refers to a computing device that may be used by a sender to initiate the process of designating postal mail as private. As described herein, the user device 110 may be used to register for an account and provide verification information. Moreover, the user device 110 may be used to obtain a privacy identifier that may be included with postal mail. User device(s) 110 may generally include any computing device that is capable of transmitting and/or receiving data over a network 150. Data may be collected from user devices 110, and data requests may be initiated from each user device 110. User device(s) 110 may be a server, a desktop computer, a laptop computer, a tablet computing device, personal digital assistant (PDA), an in- or out-of-car navigation system, a smart phone or other cellular or mobile phone, or mobile gaming device, among other suitable computing devices. User devices 110 may execute one or more client/user applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110 may be an electronic device including hardware, software, or embedded logic components or a combination of two or more such components and capable of carrying out the appropriate functions implemented or supported by the user device 110. For example, and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access a network 150. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 110 one or more Hyper Text Markup Language (HTML) files responsive to the HTTP request. The user device 110 may render a web page based on the HTML files from a server for presentation to the user. Alternatively, a Representational State Transfer (REST or REST API) may be used as the preferred data transfer mechanism. The present disclosure contemplates any suitable web page files. As an example, and not by way of limitation, web pages may render from HTML files, JavaScript Object Notation (JSON) files or Extensible Markup Language (XML) files, according to particular needs. Such pages may also execute scripts such as, for example and without limitation, those written in JAVASCRIPT, JAVA, combinations of markup language and scripts, and the like. Herein, reference to a web page encompasses one or more corresponding web page files (which a browser may use to render the web page) and vice versa, where appropriate.

The user device 110 may also include an application that is loaded onto the user device 110. The application obtains data from the network 150 and displays it to the user within the application interface.

Exemplary user devices 110 are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

Network cloud 150 generally represents a network or collection of networks (such as the Internet or a corporate intranet, or a combination of both) over which the various components illustrated in FIG. 7 (including other components that may be necessary to execute the system described herein, as would be readily understood to a person of ordinary skill in the art) may be connected and may communicate with each other. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link(s) for connecting the various systems and databases described herein.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to users devices or other devices in response to HTTP or other requests from users devices or other devices. A mail server is generally capable of providing electronic mail services to various user devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients/users to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Figure 8:
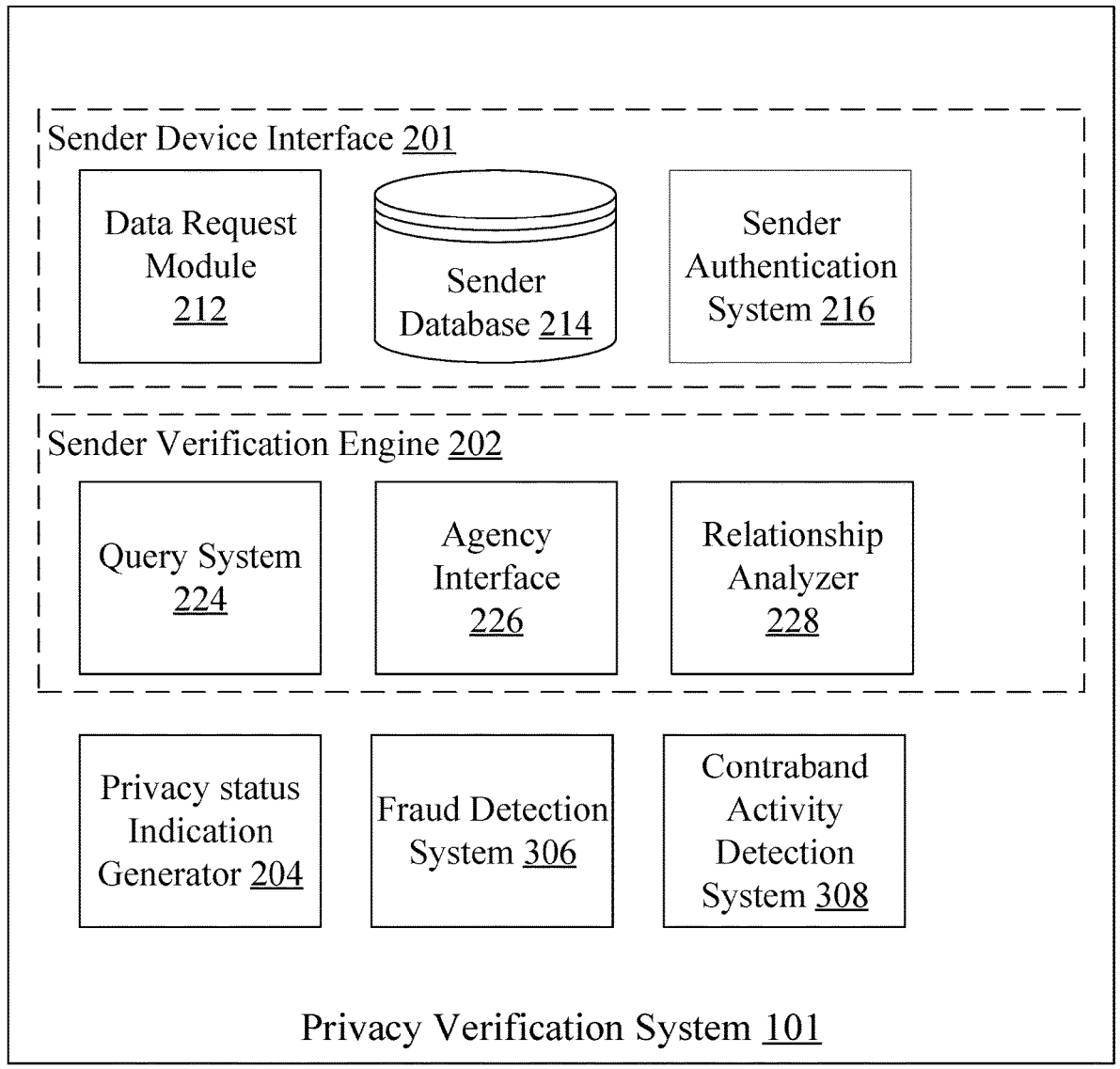
FIG. 8 illustrates various elements of a mail verification system in accordance with an exemplary embodiment of the invention.

Now referring to FIG. 8, which illustrates elements of the privacy verification system 101 in accordance with an embodiment of the invention. The privacy verification system 101 verifies the identity of a sender and generates a unique identifier for each piece of private postal mail that a sender wishes to send to an inmate at a correctional facility. In one embodiment, the privacy verification system 101 may be comprised of sender device interface 201 (which may be further comprised of data request module 212, sender database 214, and sender authentication system 216), sender verification engine 202 (which may be further comprised of a query system 224, agency interface 226, and relationship analyzer 228), privacy status indication generator 204, fraud detection system 306, and contraband activity detection system 308. Although, these components are depicted as subcomponents of the respective sender verification interface 226 or sender verification engine 202, they could also be separate, individual components, as would be readily understood by one of ordinary skill in the art.

The sender device interface 201 interfaces with the user device 110, which may be connected to the privacy verification system 101 via a network 150 to enable a sender to log into the system and generate an identifier that may be associated with the sender's private postal mail. The data request module 212 may request sender verification data from the sender that may be necessary to verify the sender's status as someone who is permitted to send private postal mail. In one embodiment, the data request module 212 may request information types based on selections and/or information provided by the sender. For example, if a sender provides that he or she is associated with an attorney, the data request module 212 may request the attorney's bar number and state information (i.e. the state in which the sender is permitted to practice law). Similarly, if a sender provides that he or she is associated with a medical practitioner, the data request module 212 may request the medical practitioner's license number or the like. In other instances, the data request module 212 may request the attorney's law firm name, if applicable, professional and/or personal address, email address, etc. In one embodiment, the sender verification data may be used to verify the sender's theoretical ability to send private communication to a recipient. In one embodiment, the data request module 212 may request and obtain secondary sender data, which may be comprised of, for example, intended recipient information, metadata information associated with the request to send private postal mail, date and/or time associated with the request, etc.

The information provided by the sender may be stored in a sender database 214. For example, the sender's name, address, bar number, state bar information, and other relevant information may be logged into the sender database 214. In one embodiment, other information, which is also referred to as secondary sender data may be obtained, which may include metadata associated with the sender's request to send private postal mail, IP address of the sender's user device, unique identifier of the sender's user device 110, geo-location or approximate location of the sender's user device 110, the date and time of the request, the name of the intended recipient, etc. may also be recorded in the sender database 214. In one embodiment, the secondary sender data may be used to perform additional downstream analysis that is described in greater detail below.

The sender authentication system 216 generates a user profile for senders who are verified to be able to send private postal mail. In one embodiment, the sender authentication system 216 may leverage the information that is provided by the sender, including the sender's name, email address, physical mailing address, etc. The sender may be asked to generate a password to access his or her profile and/or a password may be generated for the sender. The sender may use his or her profile to subsequently log into the system and request a privacy mail identifier for each piece of postal mail that should be treated as private. Once a user profile is generated (and the sender's privacy status is verified), the verification process does not need to be repeated to obtain subsequent privacy identifiers. Instead, verification may be performed periodically, such as, quarterly, annually, semi-annually, after a designated number of privacy identifier requests, etc. as would be apparent to a person of ordinary skill in the art.

Now referring to the sender verification engine 202, which verifies the sender's privacy status (i.e. the sender's theoretical ability to send private postal mail). In one embodiment, the sender verification engine 202 may be comprised of a query system 224, an agency interface 226, and a relationship analyzer 228. The query system 224 queries various other public and/or private databases to verify the sender's ability to send private postal mail. In the example above, the query system 224 may query a state bar database to determine whether the sender is an active status attorney in a state who is able to send private postal mail. In other instances, the query system 224 may query a database of authorized medical providers to determine if the sender is permitted to send private postal mail. In one embodiment, the query system 224 may query other databases such as the department of motor vehicles to verify the address provided by the sender. This additional querying step may be used to, for instance, determine that the sender is not pretending to be an individual who is permitted to send private postal mail. In these instances, the data request module 212 may request additional information that is likely to be known only to the sender and verifiable from public and/or private databases. In one embodiment, the query system 224 may verify or query sender verification data to verify the sender's theoretical ability to send private postal mail.

The agency interface 226 interfaces with verification agencies 102 to obtain privacy status of a sender (i.e. the sender's theoretical ability to send private postal mail). As described above, verification agencies 102 may, separately and/or in conjunction with the privacy verification system 101, determine whether a sender is permitted to send private postal mail. The verification agencies 102 may query public and or private databases and/or may employ human reviewers to verify the sender's privacy status. The agency interface 226 may receive the results of the analysis performed by the verification agencies 102 and store the results in the sender database 214. In one embodiment, agency interface 226 may verify sender verification data to verify the sender's theoretical ability to send private postal mail.

The relationship analyzer 228 may perform additional analysis to determine if the sender is permitted to send private postal mail to an inmate recipient at a correctional facility. In one embodiment, the relationship analyzer 228 may require the sender to furnish a signed engagement agreement, such as in the example from above regarding attorney-client privilege. In other instances, the relationship analyzer 228 may obtain public data indicating that the sender and the recipient may initiate private communication, by, for example, obtaining and/or analyzing press release documents, court filing documents, etc.

The privacy status indication generator 204 generates identifiers that can be associated with private postal mail that a sender would like to send to an inmate at a correctional facility. In one embodiment, the identifiers may be unique and/or randomly generated. A variety of different identifiers may be generated, including, but not limited to numbers, alpha-numeric codes, QR codes, bar codes, pictures, or other identifiers as would be apparent to someone skilled in the art. The identifiers may be affixed and/or represented on postal mail to help the facility mail system 108 in identifying private postal mail that should be processed specially (i.e., for example, not be opened and/or digitized without the inmate's permission).

The privacy verification system 101 may communicate with the facility mail system 108 of the incarceration facility to inform the facility that it will be receiving private postal mail labeled with a unique identifier. For example, when a sender uses the privacy verification system to obtain an identifier from the privacy status indication generator 204, this may serve as an indicator to have the privacy verification system 101 notify the incarceration facility, in particular the facility mail system 108, that private postal mail is being prepared, and likely to arrive soon. This may help incarceration facility personnel to know approximately when private postal mail is likely to arrive and what is contained in the mail (e.g. private communication or other information as would be apparent to one skilled in the art).

The privacy verification system 101 may also communicate with the facility mail system 108 to validate that the target recipient is active, in-custody and eligible to receive private postal mail. This validation may rely on the use of a recipient inmate identifier. In one embodiment, the recipient inmate information may be received from The fraud detection system 306 and contraband activity detection system 308 may, respectively, perform additional processing to help determine whether a sender may be disguising non-private postal mail as private postal mail, and/or identify the likelihood that the mail may be used to further undesirable behavior such as committing a crime or inciting violence, or to pass an illegal substance. The fraud detection system 306 and contraband activity detection system 308 are described in more detail in reference to FIG. 9 below and that discussion is incorporated by reference herein. In one embodiment, the fraud detection system 306 and contraband activity detection system 308 may initiate analysis when the mail facility system 108 scans and/or receives private postal mail with an identifier generated by the privacy verification system 101. In one instance, for example, when an identifier is scanned at the mail facility system 108 the system may provide the identifier information along with related data such as sender and recipient information, date and time receipt, etc. The fraud detection system 306 and contraband activity detection system 308 may perform additional analysis, in accordance with the description below, based on the provided information. As would be apparent from this discussion, the fraud detection system 306 and/or the contraband activity detection system 308 may be implemented in the privacy verification system 101 and/or the facility mail system 108.

Figure 9:
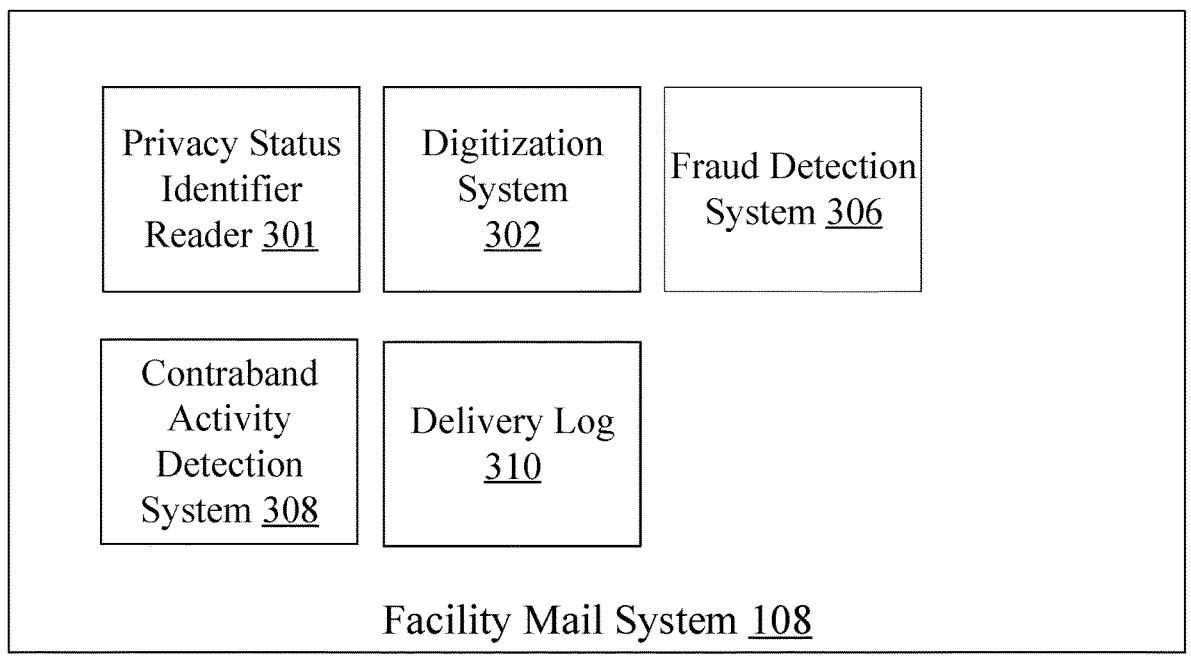
FIG. 9 illustrates various elements of a correctional facility system in accordance with an exemplary embodiment of the invention.

FIG. 9 illustrates an exemplary embodiment of the facility mail system 108, which enables a correctional facility to read the unique identifier attached to a mail or package coming into the correctional facility and verify that the mail or package meets the incarceration facility's requirements for private postal mail. The facility mail system 108 may be comprised of a privacy status identifier reader 301, mail digitization system 302, contraband activity detection system 308, fraud detection system 306 and delivery log 310.

The privacy status identifier reader 301 identifies privacy status identifiers that may be associated with private postal mail. For example, in one embodiment, the privacy status identifier reader 301 may use machine vision or image processing analysis to identify labels of a pre-determined color, shape, and/or size, which may indicate that a privacy status identifier is attached. In other embodiments, the privacy status identifier reader 301 obtains additional data associated with privacy status identifier. For example, the privacy status identifier reader 301 may capture, interpret, and retrieve data associated with, for example, a bar code, a QR code, etc. In one embodiment, the privacy status identifier reader 301 may obtain privacy status identifier data, which may include, for example, a date that the privacy status identifier was generated, a date that the request to send private postal mail was received, and sender identity. In one exemplary embodiment a human may review incoming postal mail to determine whether it contains a privacy status identifier, and may provide the relevant information to the privacy status identifier reader 301.

The mail digitization system 302 serves to scan received mail into an electronic or digital form to be relayed to an inmate. In the case of the privacy status identifier reader 301 detecting an identifier indicative of private postal mail, this can prevent the private postal mail from being digitized by the mail digitization system 302 so that the mail can be appropriately processed for delivery to the inmate unopened with privacy intact. If a privacy status identifier is associated with a private postal mail, the mail digitization system 302 may digitize the envelope or the exterior portion of the private postal mail. The information on the envelope may be further processed, via an optical image recognition system or a computer vision system, to identify sender information, recipient information. This information is herein also referred to as facility data. In one embodiment, facility data may also be comprised of receipt date indicating a date or time when the private postal mail may be received at a facility. In one embodiment, the mail receipt date may be obtained as metadata from the privacy status identifier reader 301.

The fraud detection system 306 performs fraud detection analysis based on the obtained facility and at least one of sender verification data, secondary sender data and privacy status identifier data. In one embodiment, the fraud detection system 306 may trigger a fraud alert if at least one of the obtained facility data and at least of the obtained sender data does not match. For example, the fraud detection system 306 triggers a fraud alert if sender information in the facility data and sender information in at least one of the sender verification data and the sender information in the secondary sender data does not match. In another example, the fraud detection system 306 triggers a fraud alert if recipient information in the facility data and intended recipient information in the secondary sender data does not match. Similarly, the fraud detection system 306 triggers a fraud alert if a receipt date associated with the facility data and the request data associated with the secondary sender data do not meet a threshold. In other words, in some embodiments, the fraud detection system 306 examines the information from the privacy status identifier and other aspects of the private postal mail to see if it contains questionable information about the private postal mail that should alert prison or jail personnel. Such information includes wrong addresses, wrong name, suspicious sender name and address, and others. Other issues that the fraud detection system 306 may detect include missing information or wrong combinations of such information. In one embodiment, the fraud detection system 306 may identify wrong information by comparing the data comprised in, for example, the envelope of the private postal mail that has a privacy status indicator and comparing it against privacy status identifier data that may have been generated when the privacy status identifier may have been generated (and may contain sender data and/or secondary sender data) by accessing the privacy status identifier data via the privacy status identifier reader 301.

In one embodiment of the inventive system, a contraband activity detection system 308 performs contraband activity detection analysis based on facility data associated with two or more received private postal mails with the generated privacy status identifier. In one embodiment, the contraband activity detection system 308 may trigger a contraband alert if two or more private postal mails received by the mail processing facility have the same unique privacy status identifier. In one embodiment, the contraband activity detection system 308 may trigger a contraband alert if one sender is associated with several private postal mailings to multiple inmates at a correctional facility, wherein the private postal mailings are received by a mail processing facility within a threshold timeframe. In one embodiment, the contraband activity detection system 308 performs contraband activity detection analysis based on data associated with two or more received private postal mails with different generated privacy status identifiers. The fraud detection system 308 identifies an overall trend of past events from analyzing past private postal mail information to see if there are patterns to describe likelihood of crime, malfeasance, or other insidious activity. The contraband activity detection system 308 tracks and stores information from current and past private postal mail such as the PIN, QR code, address information, etc. and analyzes trends through Machine Learning or other algorithms as would be apparent to someone skilled in the art to alert law enforcement or prison officials to abnormal events. For example, the contraband activity detection system 308 may analyze data from current and past private postal mailings to detect whether one sender is associated with several private postal mailings to one or multiple inmates at a correctional facility within a predetermined threshold timeframe and trigger an alert if the number of mailings in a given timeframe appears unusual or suspicious or exceeds a predetermined value. In addition, the contraband detection system may serve to ensure that contraband such as photographs, pornography, illegal drugs or substances, something that could be used as a weapon, or something that could be used to otherwise harm another person, is not being delivered to the inmate by for example, identifying suspicious patterns in postal mail that is marked as having a privacy status identifier.

The delivery log 310 enables the facility mail system 108 to maintain records of private postal mail labeled with identifiers created by this system. The delivery log 310 may be digital, and information maintained by the delivery log 310 may be used for further analysis by the fraud detection system 306.

Figure 10:
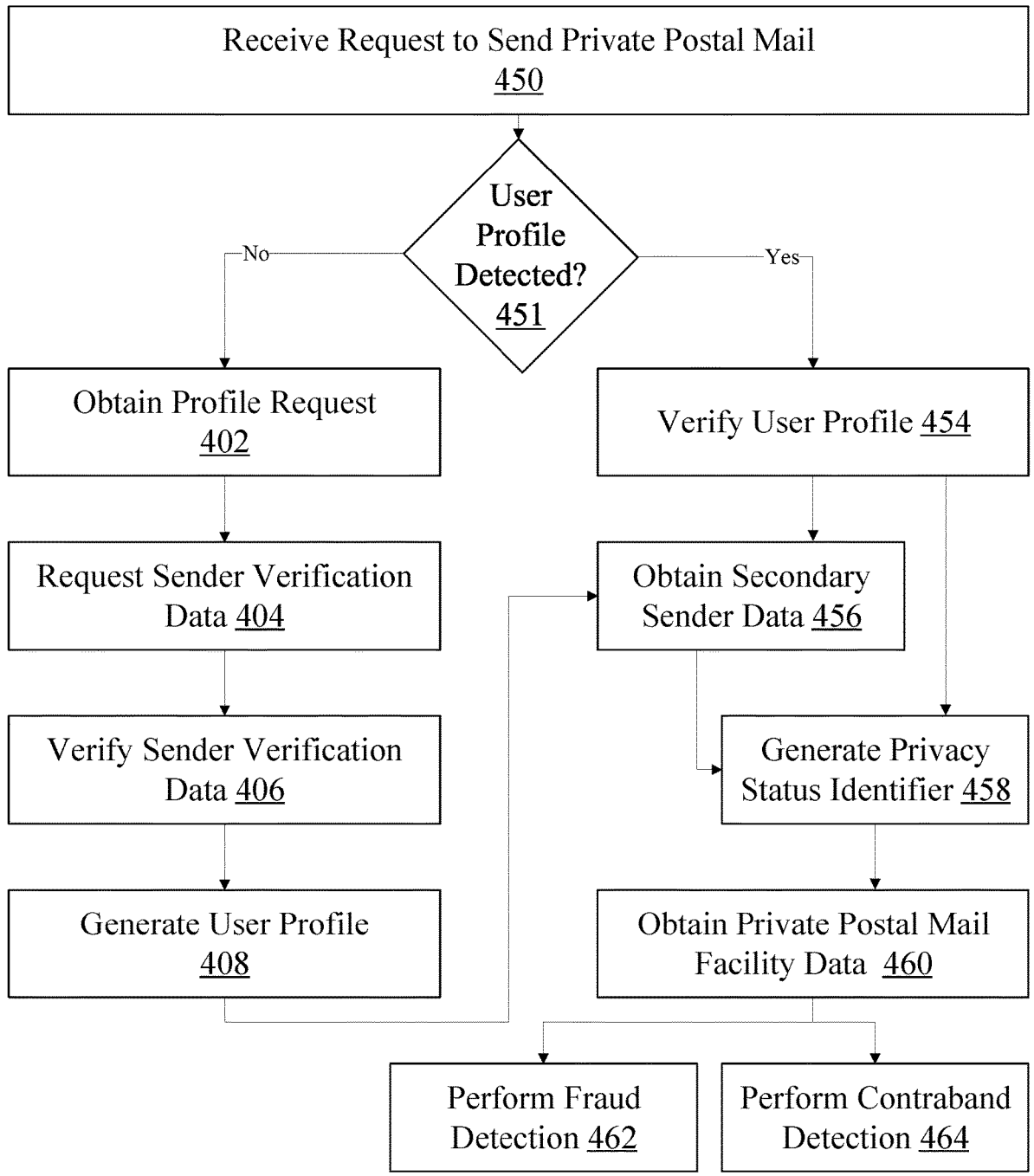
FIG. 10 illustrates a flowchart of an exemplary process for processing and verifying private mail that is sent to an inmate at a correctional facility.

FIG. 10 illustrates an exemplary computer implemented process, or method, for tracking private postal mail in a correctional facility.

The process may begin with receiving a request from a sender to send private postal mail at step 450. The request may be initiated from a computing device that is associated with the sender as described in reference to FIG. 7. At step 451, the system determines if the sender has an existing user profile. If it is determined at step 451 that the user does not have a user profile, the user may be asked if they would like to create a new user profile. When a user opts to create a new user profile, the process proceeds to receiving a new user profile request from a sender at 402. In one exemplary embodiment of this step in the process, the profile request may be received from the sender's user device and may include very general information (e.g., name, date of birth, email address).

After a profile request from a sender 402 is received, a request is sent to the sender asking for more detailed sender verification data 404. The sender verification data may include the sender provided data such as the sender's Bar Card Number, Medical License Number, Driver's License Number, Social Security Number, address, or other data that can validate the sender's theoretical ability to send private postal mail such as privileged postal mail or mail that should not be opened or reviewed by the mail processing facility that is associated with the correctional facility. The sender verification data may be received from the sender's computer, mobile phone, an app, or other user device or mechanism for sending information.

The process then attempts to verify the sender verification data 406 by comparing the sender verification data with other data, including, but not limited to data found in agencies and/or in the publicly maintained databased and/or private databases. Some public agencies such as the Department of Motor Vehicles, the Social Security Administration, and State Bar Associations may have information about various persons. At step 406 agency data may be retrieved and compared to sender verification data for possible matches. The verification data may be saved in a database or other repository within the system for accessing at a later time. If the sender data is verified, then the process will generate a user profile 408 for the sender and proceed to step 456 described below directly to step 458, which is not specifically illustrated in FIG. 10 for ease of review. However, in some instances, additional secondary data may be obtained 456 and, in other instances, privacy status identifier 458 may be generated after the user profile is generated 408.

Returning to step 451, if it is determined that the sender has an existing user profile, the process proceeds to step 454 to verify the user profile is valid. The verification at 454 may obtain sender provided data in the user profile and verify the data as in step 406 above by comparing the existing verification data with data found in various agencies in order to ensure the user is still a valid user and authorized to send private postal mail.

If the sender's profile is verified 454, the process then proceeds to obtain secondary sender data 456. Secondary sender data may be comprised of a variety of different information that may be associated with the sender, the intended recipient, the request to send private postal, and/or information associated with the sender's computing device. In one embodiment, secondary sender data may be comprised of intended recipient information, which may be obtained from the sender and/or from the sender's request to send private postal mail 450. In other instances, the secondary sender data may be comprised of the intended recipient inmate's name, address, inmate ID, or other information associated with the inmate as would be apparent to one skilled in the art. In other embodiments, secondary sender data may be comprised of sender information and/or information about the date and/or time that the request to send private postal mail 450 was initiated. In other or same embodiments, secondary sender data may be comprised of information associated with the sender's computing device, such as the computing device's identifier, such as a Unique Device Identification Code, IP address, MAC address, and/or other data that may be used to identify the computing device's geo-location. In one embodiment, the secondary sender data step 456 may be bypassed or may be optional and the process may continue to generate a privacy status identifier 458 if the user profile is verified 454.

At step 458 the process may generate a privacy status identifier. In one embodiment, the privacy status identifier may be affixed to a private postal mail to indicate that a postal mail that is send to an inmate as a correction facility is a private postal mail that should not be read and/or otherwise digitized in a manner such that the content of mail may be read by someone other than the intended recipient. The term affixed is used generally here and may refer printing the privacy status identifier on postal mail that should be treated as private postal mail. In some embodiments, each privacy status identifier may be unique and/or may be randomly generated. As would be understood by a person of ordinary skill in the art, a unique privacy status identifier may be used for further downstream analysis as described in greater detail in this document. A privacy status identifier may by embodied in a variety of different ways, including, but not limited to a number, PIN, QR Code, picture, other scannable or readable label or the like, or some other method for identification that would be understood by someone skilled in the art. Additionally, the secondary sender data and the privacy status identifier may be saved in the system's database or other repository for future access. In one embodiment, the process may terminate after a privacy status identifier is generated 458.

Postal mail, including private postal mail, may be processed at a mail processing facility associated with a corrections facility. The mail processing facility may or may not be located at the same location as the correctional facility. In one embodiment, the mail processing facility may send facility data when a postal mail or private postal mail with a privacy status identifier is processed. In other words, facility data may be obtained 460 when postal mail or private postal mail with a privacy status identifier is processed at a corrections facility and/or a mail processing facility associated with a corrections facility. In one instance, the presence of privacy status identifier may indicate that the associated mail should be handled differently than non-private postal mail in order to maintain privacy. For example, the mail processing facility or the correctional facility may automatically reject digitization efforts on private postal mail or postal mail that is marked as private by a privacy status identifier.

In one embodiment, the facility data may comprise a variety of information that may be obtained from the private postal mail and/or the privacy status identifier. In one embodiment, facility information may be comprised sender information (i.e. the name of the sender as presented in the private postal mail envelope, for example), recipient information (i.e. name of the recipient provided on the private postal mail envelope, for example), date of receipt data (i.e. the date that the private postal mail was sent and/or processed at the facility, for example). In other or same embodiments, facility data may include privacy status identifier information including, for example, a unique identifier that may be associated with the privacy status identifier. Facility data may also include other data that may be associated with the privacy status identifier, which may be obtained from accessing appropriate databases, such as sender verification data, etc.

Sender verification data, secondary sender data, and/or facility data may be used to perform fraud detection analysis 462 and/or contraband activity detection 464. These steps of fraud detection and contraband activity detection are performed as described above with respect to FIG. 8 and FIG. 9. Briefly, fraud detection analysis 462 may be based on the obtained facility data and the obtained secondary sender data. A fraud alert may be triggered if the obtained facility data and at least of the obtained sender data does not match. In one embodiment, the fraud alert may be generated if sender information in the facility data and sender information in at least one of the sender verification data and the sender information in the secondary sender data does not match. In one embodiment, a fraud alert may be triggered if recipient information in the facility data and intended recipient information in the secondary sender data does not match. In one embodiment, a fraud alert may be triggered if a receipt date associated with the facility data and the request data associated with the secondary sender data do not meet a threshold. A threshold, as used herein, may refer to the amount of time that has transpired between the request date and the receipt date. A large difference (i.e. beyond a threshold) in the two dates may indicate that that fraud may be likely.

Contraband analysis 464 may be performed based on facility data associated with two or more received private postal mails with the generated privacy status identifier. In one embodiment, the contraband activity detection step 464 may trigger an alert if two or more private postal mails received by the mail processing facility have the same unique privacy status identifier. In one embodiment, the contraband analysis 464 may be performed by analyzing data associated with two or more received private postal mails with different generated privacy status identifiers. For example, contraband activity detection 464 may triggers an alert if one sender is associated with several private postal mailings to multiple inmates at a correctional facility, wherein the private postal mailings are received by a mail processing facility within a threshold timeframe.

While the above is described in reference to private postal mail which is one embodiment of the invention, the invention, in one embodiment, also encompasses digital communications, such as email and the like. In these embodiments, the privacy status identifier could be applied for and generated in accordance to the description above for digital communication and a digital privacy status identifier may be associated with the relevant private digital messages. Fraud and contraband analysis may be performed on digital privacy status identifiers in much the same way as described herein.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a user computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 11:
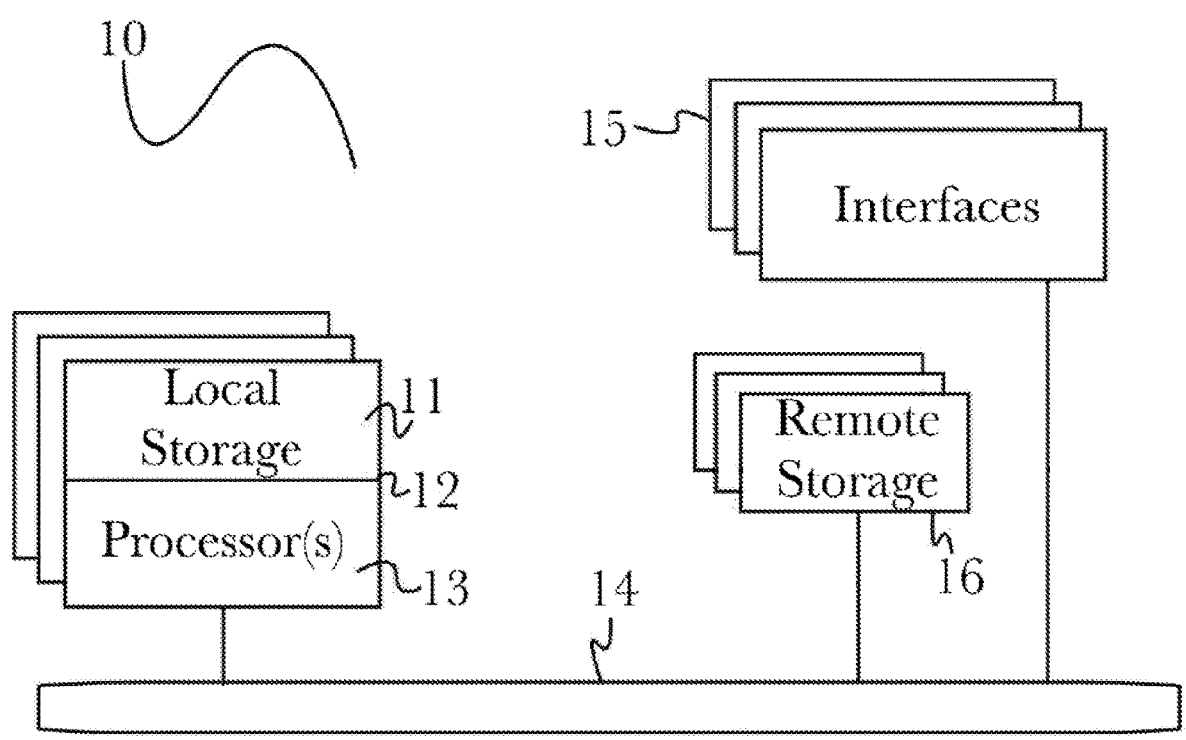
FIG. 11 illustrates an exemplary computing device that supports an embodiment of the inventive disclosure.

Referring now to FIG. 11, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients/users or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 11 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a user device (such as a tablet device or smartphone running user software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 12:
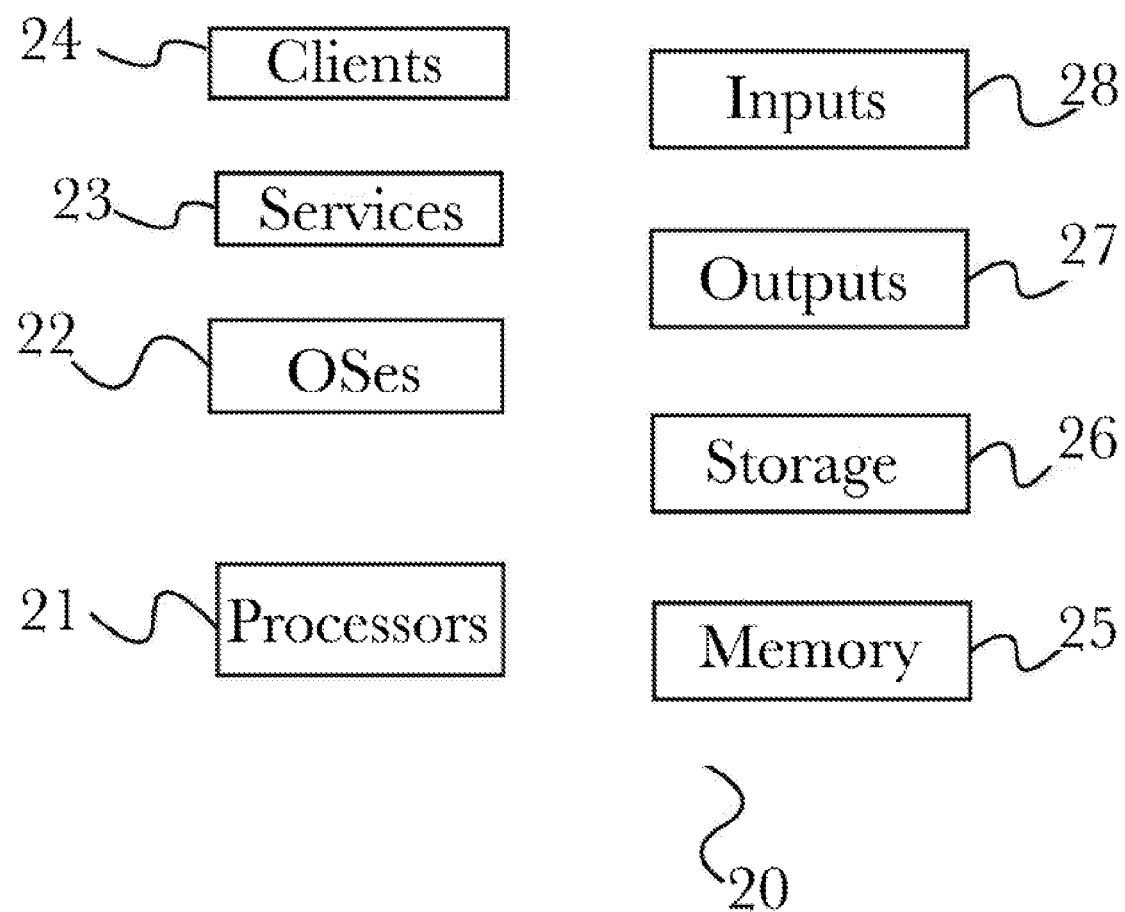
FIG. 12 illustrates an exemplary standalone computing system that supports various embodiments of the inventive disclosure.

In some embodiments, systems may be implemented on a standalone computing system. Referring now to FIG. 12, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 5). Examples of storage devices 26 include flash memory, magnetic hard drive, CD-ROM, and/or the like.

Figure 13:
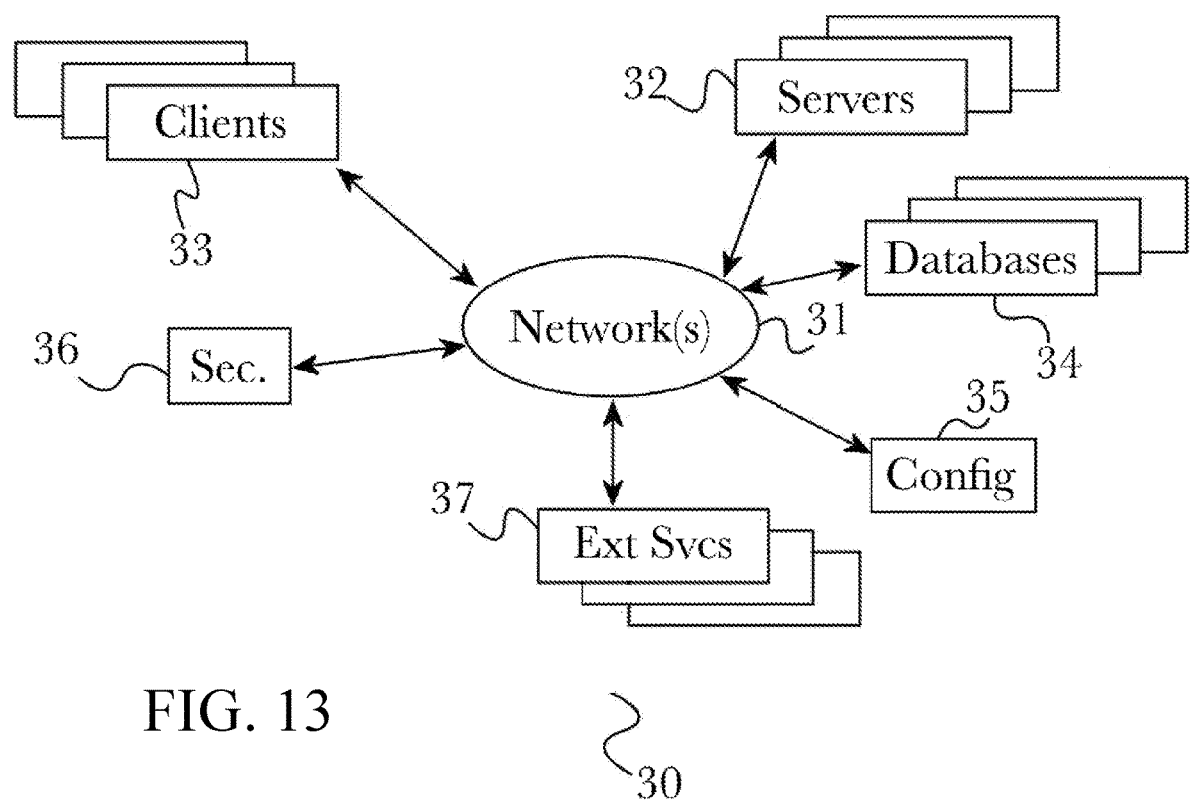
FIG. 13 illustrates one embodiment of the computing architecture that supports various embodiments of the inventive disclosure.

In some embodiments, systems may be implemented on a distributed computing network, such as one having any number of clients/users and/or servers. Referring now to FIG. 13, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 12. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 14:
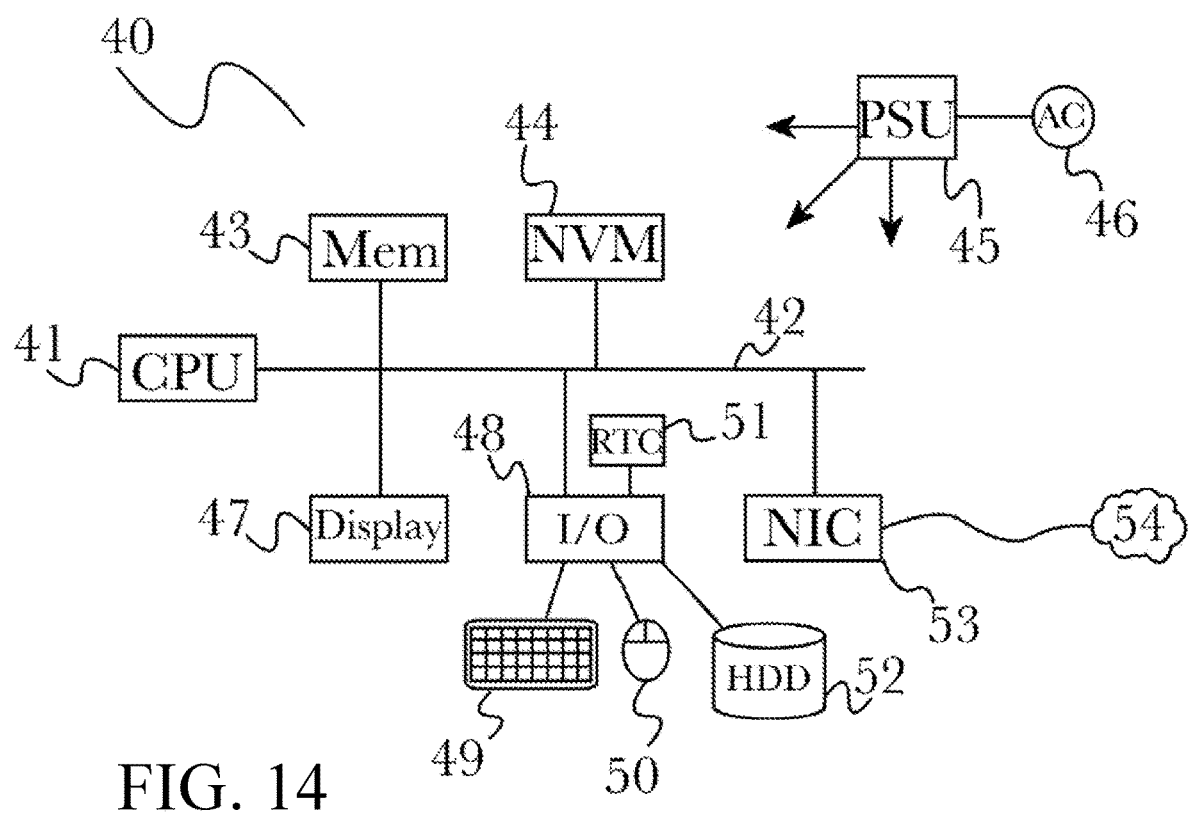
FIG. 14 illustrates an exemplary overview of a computer system that supports various embodiments of the inventive disclosure.

FIG. 14 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client/user and/or server components. For example, various software modules may be implemented for performing various functions in connection with the system of any particular aspect, and such modules may be variously implemented to run on server and/or client/user components.

The skilled person will be aware of a range of possible modifications of the various embodiments described above. Accordingly, the present invention is defined by the claims and their equivalents.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer program product for processing requests to send private postal mail to an inmate who is incarcerated at a correctional facility, the computer program product comprising a non-transitory computer readable storage medium having instructions encoded thereon that, when executed by a processor, cause the processor to:
   obtain a request from a sender to send private postal mail;
   generate a privacy status identifier if a privacy status of the sender is verified, wherein the privacy status identifier may be affixed to a private postal mail to indicate that a postal mail that is sent to an inmate is private; and
   obtain privacy status identifier data comprising at least one of a date that the privacy status identifier was generated, a date that the request to send private postal mail was received, and sender identity.

2. The computer program product of claim 1 further comprising instructions that, when executed by a processor, cause the processor to obtain, from a mail processing facility, an indication of receipt of postal mail with the generated privacy status identifier, wherein the mail processing facility processes incoming postal mail that is sent to inmates who are incarcerated in a correctional facility.

3. The computer program product of claim 2 further comprising instructions that, when executed by a processor, cause the processor to:
   obtain sender verification data;
   verify a privacy status of the sender, wherein the privacy status is comprised of a theoretical ability to send private postal mail to anyone, and wherein the verification is comprised of verifying the sender verification data with data available in one or more databases;
   obtain secondary sender data from the request to send private postal mail, the secondary sender data comprising intended recipient information and metadata information associated with the request to send private postal mail; and
   obtain facility data from the mail processing facility, the facility data comprising sender, recipient, and date of receipt data associated with received postal mail with the generated privacy status identifier.

4. The computer program product of claim 3 further comprising instructions that, when executed by a processor, cause the processor to perform fraud detection analysis based on the obtained facility and at least one of sender verification data, secondary sender data and privacy status identifier data.

5. The computer program product of claim 3 further comprising instructions that, when executed by a processor, cause the processor to perform contraband activity detection analysis based on facility data associated with two or more received private postal mails with the generated privacy status identifier.

6. The computer program product of claim 3 further comprising instructions that, when executed by a processor, cause the processor to perform contraband activity detection analysis based on facility data associated with two or more received private postal mails with different privacy status identifiers.

7. A computer-implemented method for identifying, verifying, and processing private postal mail that is sent to an inmate who is incarcerated in a correctional facility, the computer-implemented method comprising:
   obtaining a request from a sender to send private postal mail;
   generating a privacy status identifier if the privacy status of the sender is verified, wherein the privacy status identifier may be affixed to a private postal mail to indicate that a postal mail that is sent to an inmate is private.

8. The computer-implemented method of claim 7, further comprising obtaining sender data that is comprised of intended recipient information from the sender.

9. The computer-implemented method of claim 7, further comprising obtaining sender data that is comprised of metadata information from the obtained request from a sender to send private postal mail.

10. The computer-implemented method of claim 7, further comprising obtaining an indication of receipt of private postal mail with the generated privacy status identifier from a mail processing facility, wherein the mail processing facility processes incoming postal mail that is sent to inmates who are incarcerated in a correctional facility.

11. The computer-implemented method of claim 10, further comprising obtaining facility data, which is comprised of at least one of sender, recipient, and date of receipt data associated with received private postal mail with the generated privacy status identifier, wherein the sender, recipient, and date of receipt data are obtained from a mail processing facility that processes incoming postal mail that is sent to inmates who are incarcerated in a correctional facility.

12. The computer-implemented method of claim 11, further comprising:
   performing fraud detection analysis based on the obtained facility data and the obtained sender data; and
   triggering a fraud alert if the obtained facility data and the obtained sender data does not match.

13. The computer-implement method of claim 12, wherein the fraud detection analysis triggers a fraud alert if sender information in the facility data and sender information in the sender data does not match.

14. The computer-implement method of claim 12, wherein the fraud detection analysis triggers a fraud alert if recipient information in the facility data and intended recipient information in the sender data does not match.

15. The computer-implement method of claim 12, wherein the fraud detection analysis triggers a fraud alert if a receipt date associated with the facility data and the request data associated with the sender data do not meet a threshold.

16. The computer-implemented method of claim 11, further comprising performing contraband activity detection analysis based on facility data associated with two or more received private postal mails with the generated privacy status identifier.

17. The computer-implemented method of claim 16, wherein the contraband activity detection analysis triggers an alert if two or more private postal mails received by the mail processing facility have the same unique privacy status identifier.

18. The computer-implemented method of claim 16, further comprising performing contraband activity detection analysis based on data associated with two or more received private postal mails with different generated privacy status identifiers.

19. The computer-implemented method of claim 16, wherein performing contraband activity detection analysis triggers an alert if one sender is associated with several private postal mailings to multiple inmates at a correctional facility, wherein the private postal mailings are received by a mail processing facility within a threshold timeframe.

20. A computer program product for processing postal mail that is sent to an inmate who is incarcerated in a correctional facility, wherein one or more postal mail that is received at a mail processing system for the correction facility is marked as private by an identifier, the computer program product comprising a non-transitory computer readable storage medium having instructions encoded thereon that, when executed by a processor, cause the processor to:

automatically reject digitization efforts on private postal mail that is marked as private by a privacy status identifier, wherein the privacy status identifier is generated by a privacy verification system by:

obtaining a request from a sender to send private postal mail;

generating the privacy status identifier if the privacy status of the sender is verified.

\* \* \* \* \*